(12) United States Patent
Scherr et al.

(10) Patent No.: US 12,555,693 B2
(45) Date of Patent: Feb. 17, 2026

(54) GAS EQUALIZATION AND MANAGEMENT SYSTEM FOR A MOLTEN SALT NUCLEAR REACTOR

(71) Applicants: ABILENE CHRISTIAN UNIVERSITY, Abilene, TX (US); Board of Regents, The University of Texas System, Austin, TX (US); The Texas A&M University System, College Station, TX (US)

(72) Inventors: Jonathan Scherr, Abilene, TX (US); Timothy Head, Abilene, TX (US); Derek Haas, Austin, TX (US); Jack Shoemate, Abilene, TX (US); Pavel Tsvetkov, College Station, TX (US); Rusty Towell, Abilene, TX (US)

(73) Assignees: Abilene Christian University, Abilene, TX (US); Board of Regents, The University of Texas System, Austin, TX (US); The Texas A&M University System, College Station, TX (US)

( * ) Notice: Subject to any disclaimer, the term of this patent is extended or adjusted under 35 U.S.C. 154(b) by 222 days.

(21) Appl. No.: 18/452,011

(22) Filed: Aug. 18, 2023

(65) Prior Publication Data
US 2024/0062923 A1    Feb. 22, 2024

Related U.S. Application Data

(60) Provisional application No. 63/497,133, filed on Apr. 19, 2023, provisional application No. 63/399,612, filed on Aug. 19, 2022.

(51) Int. Cl.
*G21C 9/02*    (2006.01)
*G21C 3/54*    (2006.01)
*G21C 9/016*   (2006.01)

(52) U.S. Cl.
CPC ............. *G21C 9/02* (2013.01); *G21C 9/024* (2013.01); *G21C 3/54* (2013.01); *G21C 9/016* (2013.01)

(58) Field of Classification Search
CPC .......... G21C 9/024; G21C 9/02; G21C 9/016; G21C 9/022; G21C 3/54
(Continued)

(56) References Cited

U.S. PATENT DOCUMENTS 6,186,159 B1    2/2001  DeGood
8,703,063 B2    4/2014  Hottovy
(Continued)

FOREIGN PATENT DOCUMENTS

CN    103337264    10/2013
CN    103996419    8/2014
(Continued)

OTHER PUBLICATIONS

El-Genk. "A walk-away safe, Very-Small, Long-Life, Modular (VSLLIM) reactor for portable and stationary power," Annals of Nuclear Energy 129 (2019) 181-198. Jan. 13, 2019 (Jan. 13, 2019).

*Primary Examiner* — Jack W Keith
*Assistant Examiner* — Daniel Wasil
(74) *Attorney, Agent, or Firm* — King & Spalding

(57) ABSTRACT

A molten salt reactor system includes a fuel salt system configured to circulate a molten salt through a reactor vessel. The molten salt reactor system further includes an inert gas system fluidically coupled with the fuel salt system and configured to maintain a pressurized volume in a head space of a drain tank by circulating an inert gas along a first inert gas flow path. The molten salt reactor system further includes an equalization system configured to equalize pressure between head spaces of the reactor vessel and the drain tank in response to a reactor shutdown event. The inert gas (Continued)

system is configured to cease maintenance of the pressurized volume in response to the reactor shutdown event.

15 Claims, 22 Drawing Sheets

(58) Field of Classification Search
USPC .................................................. 376/280, 336
See application file for complete search history.

(56) References Cited

U.S. PATENT DOCUMENTS

| | | | |
|---|---|---|---|
| 8,767,905 | B2 | 7/2014 | Neeley et al. |
| 8,882,973 | B2 | 11/2014 | Williamson et al. |
| 9,302,226 | B2 | 4/2016 | Loewen et al. |
| 9,368,238 | B2 | 6/2016 | Theofanous et al. |
| 9,376,639 | B2 | 6/2016 | Walter et al. |
| 9,870,838 | B2 | 1/2018 | Reyes |
| 9,875,818 | B2 | 1/2018 | Mark et al. |
| 10,056,160 | B2 | 8/2018 | LeBlanc |
| 10,144,874 | B2 | 12/2018 | Walter |
| 10,176,901 | B2 | 1/2019 | Loewen |
| 10,229,757 | B2 | 3/2019 | Filippone |
| 10,510,450 | B2 | 12/2019 | Arafat |
| 10,636,532 | B2 | 4/2020 | Anderson et al. |
| 10,643,754 | B2 | 5/2020 | Venneri |
| 10,760,004 | B2 | 9/2020 | Garcia-Perez et al. |
| 10,787,609 | B2 | 9/2020 | Garcia-Perez et al. |
| 10,787,610 | B2 | 9/2020 | Goodrich et al. |
| 11,031,140 | B2 | 6/2021 | Hunt et al. |
| 11,043,309 | B2 | 6/2021 | Nygaard et al. |
| 11,145,424 | B2 | 10/2021 | Abbott |
| 11,149,623 | B2 | 10/2021 | Kutsch |
| 11,257,600 | B2 | 2/2022 | Anderson et al. |
| 11,417,437 | B2 | 8/2022 | Venneri |
| 11,434,429 | B2 | 9/2022 | Goodrich et al. |
| 11,521,757 | B2 | 12/2022 | O'Brien |
| 11,525,374 | B2 | 12/2022 | Loewen et al. |
| 11,542,437 | B2 | 1/2023 | Garcia-Perez et al. |
| 11,545,274 | B2 | 1/2023 | Bass et al. |
| 11,626,213 | B2 | 4/2023 | Regan et al. |
| 12,211,627 | B2 | 1/2025 | Reyes |
| 2016/0189813 | A1* | 6/2016 | Cisneros ............... G21C 15/28 376/360 |
| 2018/0030576 | A1 | 2/2018 | Urza |
| 2019/0057783 | A1 | 2/2019 | LeBlanc |
| 2019/0362861 | A1* | 11/2019 | O'Brien ................... G21C 9/00 |
| 2020/0105424 | A1 | 4/2020 | Schönfeldt et al. |
| 2021/0313081 | A1 | 10/2021 | Nygaard et al. |
| 2022/0051818 | A1 | 2/2022 | Cisneros et al. |
| 2022/0254527 | A1 | 8/2022 | Hinds |
| 2022/0328202 | A1 | 10/2022 | Venneri et al. |
| 2022/0328205 | A1 | 10/2022 | Bass et al. |
| 2024/0062922 | A1 | 2/2024 | Scherr |
| 2024/0087761 | A1 | 3/2024 | Clarkson |
| 2024/0428960 | A1 | 12/2024 | Venneri |
| 2025/0006385 | A1 | 1/2025 | Kugelmass |

FOREIGN PATENT DOCUMENTS

| | | |
|---|---|---|
| CN | 103366838 | 8/2015 |
| CN | 107967953 | 4/2018 |
| CN | 108151567 | 6/2018 |
| CN | 108172318 | 6/2018 |
| CN | 108511088 | 9/2018 |
| CN | 108520785 | 9/2018 |
| CN | 207850147 | 9/2018 |
| CN | 107130242 | 3/2019 |
| CN | 107945887 | 10/2019 |
| CN | 110783010 | 2/2020 |
| CN | 210039648 | 2/2020 |
| CN | 107238627 | 3/2020 |
| CN | 109036610 | 3/2020 |
| CN | 112609195 | 4/2021 |
| CN | 214529256 | 10/2021 |
| CN | 113744900 | 12/2021 |
| CN | 113936820 | 1/2022 |
| CN | 113990535 | 1/2022 |
| CN | 114093529 | 2/2022 |
| CN | 112530614 | 8/2022 |
| CN | 112992389 | 11/2022 |
| EP | 4348684 | 4/2024 |
| EP | 4377974 | 5/2024 |
| EP | 3988632 | 3/2025 |
| WO | WO 2015017928 | 2/2015 |
| WO | WO 2015/089665 | 6/2015 |
| WO | WO 2015094450 | 10/2015 |
| WO | WO 2017/205706 | 11/2017 |
| WO | WO 2018213669 | 1/2019 |
| WO | WO 2022/040116 | 3/2022 |
| WO | WO 2022146446 | 7/2022 |

* cited by examiner

| VALVE/CONNECTION | NORMAL OPERATION |
|---|---|
| OPERATING VALVE 240a | CLOSED, PERIODICALLY OPEN |
| OPERATING VALVE 258a | CLOSED, PERIODICALLY OPEN |
| OPERATING VALVE 246a | CLOSED, PERIODICALLY OPEN |
| OPERATING VALVE 232a | OPEN, CAN BE CLOSED |
| OPERATING VALVE 236a | OPEN, CAN BE CLOSED |
| EQUALIZATION SYSTEM 1100 | CLOSED |
| OPERATING VALVE 250a | CLOSED, PERIODICALLY OPEN |
| OPERATING VALVE 248a | CLOSED, PERIODICALLY OPEN |
| FLOW $O_1, O_2, O_3$ | CLOSED, PERIODICALLY OPEN |
| FLOW IG | CLOSED, PERIODICALLY OPEN |

FIG. 10

| VALVE | SHUTDOWN 1 | SHUTDOWN 2 | SHUTDOWN 3 | SHUTDOWN 4 | SHUTDOWN 5 |
|---|---|---|---|---|---|
| OPERATING VALVE 263a | OPEN | OPEN | CLOSED | CLOSED | CLOSED |
| OPERATING VALVE 263b | OPEN | CLOSED | CLOSED | OPEN | CLOSED |
| OPERATING VALVE 267a | CLOSED | OPEN | OPEN | OPEN | CLOSED |
| OPERATING VALVE 267b | CLOSED | CLOSED | OPEN | CLOSED | CLOSED |
| OPERATING VALVE 271a | CLOSED | CLOSED | CLOSED | CLOSED | OPEN |
| OPERATING VALVE 271b | CLOSED | CLOSED | CLOSED | CLOSED | OPEN |

FIG. 12

GAS EQUALIZATION AND MANAGEMENT SYSTEM FOR A MOLTEN SALT NUCLEAR REACTOR

CROSS-REFERENCE TO RELATED APPLICATIONS

The present application claims priority under 35 U.S.C. § 119 to U.S. Provisional Application No. 63/399,612, entitled "REACTOR PROTECTION SYSTEM AND METHODS", filed on Aug. 19, 2022, and U.S. Provisional Application No. 63/497,133, entitled "REACTOR PROTECTION SYSTEM AND METHODS," filed Apr. 19, 2023, in which the entirety of both are incorporated by reference herein.

TECHNICAL FIELD

The described examples relate generally to systems, devices, and techniques for managing gas (such as headspace gas) of a molten salt reactor.

BACKGROUND

Molten salt reactors (MSRs) offer an approach to nuclear power that utilizes molten salts as their nuclear fuel in place of the conventional solid fuels used in light water reactors. Advantages include efficient fuel utilization and enhanced safety (largely due to replacing water as a coolant with molten salt). In an MSR, fission reactions occur within a molten salt composition housed within a reactor vessel. Under certain circumstances, it is necessary to drain the reaction vessel (e.g., heat exchanger failure, power outage or scheduled shutdown for inspection and/or maintenance, high system temperature, power excursion, reactor control system failure, among other reasons). Typically, gravity is used to facilitate drainage, i.e., permitting the molten fuel salt composition to drain into a tank located beneath the reactor vessel. Certain regulatory requirements mandate that the reactor vessel and system be capable of shutdown by at least two independent systems so as to facilitate safety through redundancy. In many conventional designs, reactors may implement two sets of control rods for this purpose. Where inert gas is used in conventional design, such designs must ensure that the inert gas does not leak because of the presence of radionuclides.

In many MSR designs, the reactor vessel is isolated from the drain tank during normal operations by means of a freeze plug. Specifically, salt is pumped into the core by pressure difference and then a portion of the pipe connecting the drain tank(s) and the reactor vessel is cooled (e.g., by a cooling gas flow to the outside of the pipe) to a temperature below the freezing point of the salt, creating a plug. The plug is designed to melt when the cooling supply was turned off, by either exploiting the residual heat in the pipe or turning on external heaters. Safety implications can result if the freeze plug does not melt in a timely way (e.g., before the reactor reaches a critical temperature) or a power source is not available to provide external heat. In conventional designs, a freeze plug may itself undergo thermal cycling and fatigue, which could contribute to leaks of the freeze plug in certain circumstances. As such, there remains a need for improved drainage systems for MSRs in which the MSR can be effectively depressurized, including during a loss of power event.

SUMMARY

In one example, a molten salt reactor system is disclosed. The molten salt reactor system includes a fuel salt system configured to circulate a molten salt through a reactor vessel. The molten salt reactor system includes an inert gas system fluidically coupled with the fuel salt system and configured to maintain a pressurized volume fluidically between the molten salt and a drain tank by circulating an inert gas along a first inert flow path. The molten salt system further includes an equalization system configured to equalize pressure between all head spaces of the molten salt reactor system including the reactor vessel and the drain tank in response to a shutdown event. The inert gas system is configured to cease maintenance of the pressurized volume in response to the shutdown event.

In another example, the equalization system may include a first flow path with one or more fail-open equilibrium control valves in series with one another and each fluidically coupling the head space of the reactor vessel and the drain tank.

In another example, the equalization system may further include a second flow path with one or more fail-open equilibrium control valves in series with one another and each fluidically coupling the head space of the reactor vessel and the drain tank.

In another example, the equalization system may further include a cross-connection fluidically coupling the first pair of fail open equilibrium control valves and the second pair of equilibrium control valves.

In another example, the equalization system further includes a third flow path with one or more fail-open equilibrium control valves in series with one another and each fluidically coupling the head space of the reactor vessel and the drain tank.

In another example, at least one fail-open equilibrium control valve may be associated with a bypass comprising a burst disc.

In another example, in response to the associated fail-open equilibrium valve malfunctioning during a shutdown event, a pressurized gas container is configured to release pressurized contents of the container and cause a rupture of the burst disc, thereby permitting a flow to bypass the associated fail-open equilibrium valve.

In another example, in response to the associated fail-open equilibrium valve malfunctioning during a shutdown event, the burst disc may be mechanically or thermally ruptured, thereby permitting a flow to bypass the associated fail-open equilibrium valve.

In another example, the inert gas system may include a pair of fail-open inert gas control valves. The pair of fail-open inert gas control valves may be configured to equalize pressure between the head space of the reactor vessel and the drain tank in response to a shutdown event.

In another example, the pair of fail-open inert gas control valves may be configured to equalize pressure between the head space of the reactor vessel and the drain tank automatically in response to an occurrence of both the shutdown event and a failure of the equalization system to equalize pressure between the head space of the reactor vessel and the drain tank.

In another example, the inert gas system may include a first inert gas vessel, a second inert gas vessel fluidically coupled with the first inert gas vessel, and a compressor in-line between the first inert gas vessel and the second gas vessel. The first inert gas vessel may be arranged to receive the inert gas from at least the first inert gas flow path. Further, the compressor may be configured to receive a flow of inert gas from the first inert gas vessel, increase a pressure of the flow of inert gas, and cause the flow of inert gas to be delivered to the second inert gas vessel. Further, the second inert gas vessel may be arranged to deliver the inert gas to at least the first inert gas flow path.

In another example, the inert gas system may be configured to maintain a first inert gas pressure in the first inert gas vessel at around +2 psig to −2 psig. The inert gas system may be further configured to maintain a second inert gas pressure in the second inert gas vessel at around 50 psig. The inert gas system may be further configured to maintain a third inert gas pressure in the pressurized volume associated with the drain tank at around 30 psig.

In another example, the inert gas system may be further configured to maintain a gas seal at a reactor pump by circulating the inert gas along a second inert gas flow path, the reactor pump configured to drive the molten salt along the molten salt loop. In this regard, the inert gas system may be further configured to relieve the gas seal in response to the shutdown event.

In another example, a molten salt reactor system is disclosed. The molten salt reactor system includes a reactor vessel and a fluidically coupled drain tank, each defining a portion of a molten salt system configured for circulation of a molten salt therethrough. The molten salt reactor system further includes an inert gas vessel. The inert gas vessel is operable to support: (i) a circulation of an inert gas along a first inert gas flow path through the drain tank for maintenance of a pressurized volume therein that mitigates flow of the molten salt into the drain tank, and (ii) a circulation of the inert gas along a second inert gas flow path through a headspace of one or more additional components of the molten salt system. The molten salt reactor system further includes a pair of fail-open equilibrium control valves configured to equalize pressure between a head space of the reactor vessel and the drain tank in response to a shutdown event. The molten salt reactor system further includes a plurality of coordinated shutdown valves configured to cease circulation of the inert gas flow through each of the first and second inert gas flow paths in response to the shutdown event.

In another example, the pair of fail-open equilibrium control valves and the plurality of coordinated shutdown valves may be actuated by a loss of a supply of power to the system.

In another example, the pair of fail-open equilibrium control valves and the plurality of coordinated shutdown valves may be actuated in response to a change in a monitored set point, the monitored set point including one or more of temperature, pressure, or a combination thereof.

In another example, the molten salt includes a high-assay, low-enriched uranium (HALEU).

In another example, the pair of equilibrium control valves may run in series with one another and each fluidically couple the head space of the reactor vessel and the drain tank. Further, at least one of the fail-open equilibrium control valves may be associated with a bypass including a burst disc and a pressurized gas container, the pressurized gas container selectively isolated from the bypass. In turn, in response the associated fail-open equilibrium valve malfunctioning during a shutdown event, the pressurized gas container may be configured to release a pressurized contents of the container and cause a rupture of the burst disc, thereby permitting a flow to bypass the associated fail-open equilibrium valve.

In another example, a method is disclosed. The method includes circulating a molten salt through a reactor vessel. The method further includes circulating an inert gas along a first inert gas flow path and maintaining a pressurized volume fluidically between the molten salt and a drain tank.

The method further includes detecting a shutdown event. The method further includes, in response to a detection of the shutdown event, opening an equalization system and equalizing pressure between a head space of the reactor vessel and the drain tank. The method further includes, in response to a detection of the shutdown event, ceasing circulation of the inert gas along the first inert gas flow path.

In another example, the method further includes in response to a failure of the opening of the equalization system, equalizing pressure between a head space of the reactor vessel and the drain tank using a pair of secondary fail-open control valves that are associated with controlling the circulation of inert gas during normal operations.

In another example, the method may further includes receiving the inert gas from each of the first inert gas flow path and a second inert gas flow path associated with a headspace of one or more additional components of the molten salt system into a first inert gas vessel. The method may further include receiving a flow of the inert gas from the first inert gas vessel at a compressor. The method may further include causing an increase in the pressure of the flow of inert gas using the compressor and routing the flow of inert gas to a second inert gas vessel. The method may further include distributing the inert gas from the second inert gas vessel to each of the first inert gas flow path and the second inert gas flow path.

In another example, a second inert gas pressure in the second inert gas vessel is around 50 psig.

In another example, the equalization system includes a pair of primary fail-open equilibrium control valves that run in series with one another and each fluidically couple the head space of the reactor vessel and the drain tank. In this regard, at least one of the primary fail-open equilibrium control valves may be associated with a bypass comprising a burst disc and a pressurized gas container, the pressurized gas container selectively isolated from the bypass. Further, the method may include, in response to the associated primary fail-open equilibrium valve malfunctioning during a shutdown event, releasing pressurized contents from the pressurized gas container and causing a rupture of the burst disc, thereby permitting a flow to bypass the associated primary fail-open equilibrium valve.

In another example, disclosed herein are reactor protection systems (RPSs) and methods. Also disclosed are molten salt reactors (MSRs) comprising such RPSs. The RPS may incorporate some or all of the components of an equalization system, an inert gas system, and a fuel salt system, such as any of the equalization systems, the inert gas systems, and the fuel salt systems described herein.

In another example, a reactor protection system is disclosed that permits drainage of a reactor vessel within about one minute.

In another example, the reactor protection system may be a passive system. In this regard, no power source may be required for the system to be actuated.

In another example, the reactor protection system may be an active system. In this regard, a power source may be required and optionally, an operator.

In another example, a passive reactor protection system is disclosed including a plurality of equilibrium control lines, a reaction vessel and a drain tank(s) positioned below the reaction vessel. Each equilibrium control line may include a fail-open equilibrium control valve.

In another example, the plurality of equilibrium control lines may connect a first pressure control line and a second pressure control line. For example, the first pressure control line may connect to a drain tank(s) and the second pressure control line may connect to a reactor access vessel (RAV). The RAV may be configured as a type of surge tank or fluid column that includes a gas-salt interface.

In another example, the passive reactor protection system may include four equilibrium control lines, which each include a fail-open equilibrium control valve. The first and second equilibrium control lines may connect a first pressure control line and a second pressure control line and the third and fourth equilibrium control line connect to a third pressure control and a fourth pressure control line. In some cases, the first and third pressure control line may connect to a drain tank and the second and forth pressure control lines connect to the RAV.

In another example, the opening of at least one fail-open equilibrium control valve equalizes or substantially equalizes gas cover pressure between the RAV and the drain tank, resulting in drainage of about 75% or more the molten fuel salts from the reaction vessel to the drain tank(s) through a connecting pipe.

In another example, the passive reactor pressure system may be capable of rendering the reactor subcritical in about one minute or less.

In another example, an active reactor protection system is disclosed. The system includes a plurality of equilibrium control lines each including an equilibrium control valve, a reactor vessel and a drain tank(s) positioned below the reactor vessel.

In another example, the active reactor protection system may be automatically activated in response to a change in one or more monitored set points, e.g., by a switch.

In another example, the reactor protection system may be activated by an operator (e.g., an on-site or remote operator) for example, in response to a change in one or more monitored end points. The monitored set points may vary, for example, and may include temperature, pressure, power, neutron flux, high radiation levels, an operator-custom set point or any combination thereof.

In another example, the change may be a decrease in temperature to about 550° C. or less. The temperature decrease may be defined as being sufficiently above the fuel salt liquidus to ensure drainage under adverse circumstances.

In another example, the equilibrium control valves may be gas control valves, e.g., helium control valves.

In another example, the plurality of equilibrium control lines may connect a first pressure control line and a second pressure control line. In this regard, the first pressure control line may connect to a drain tank and the second pressure control line connects to an RAV.

In another example, the opening of at least one gas control valve within at least one equilibrium control line may substantially equalize gas cover pressure between the RAV and a drain tank positioned below the RAV, resulting in drainage of molten fuel salts from the reactor vessel to the drain tank(s).

In another example, the opening of at least one equilibrium control valve may equalize or substantially equalize gas cover pressure between the RAV and the drain tank, resulting in drainage of about 75% or more the molten fuel salts from the reactor vessel to the drain tank(s) through a connecting pipe.

In another example, the passive reactor pressure system may be capable of rendering the reactor subcritical in about one minute or less.

In another example, a thermal molten salt reactor is disclosed. The reactor includes a reactor protection system disclosed herein, wherein the thermal molten salt reactor does not comprise one or more components selected from a freeze plug or valve, an emergency cooling system, an active decay heat removal system or a backup or emergency power (e.g., electrical) supply.

In another example, the molten salt reactor can be shut down in about one minute or less.

In another example, a molten salt reactor may include the passive reactor protection system disclosed herein.

In another example, a molten salt reactor may include the active reactor protection system disclosed herein.

In another example, the molten salt reactor may utilize enriched uranium as a fuel and more particularly, high-assay, low-enriched uranium (HALEU).

In another example, the molten salt reactor may utilize a fluorine-based molten salt and more particularly, FLiBe.

In another example, a method is provided for draining a reactor vessel containing molten fuel salts is disclosed. The method includes equalizing or substantially equalizing the pressure between a RAV and a drain tank.

In another example, the equalizing may include opening one or more equilibrium valves within a plurality of equilibrium control lines.

In another example, the opening may occur passively, i.e., in response to power loss. In this regard, the equilibrium valve may be a fail-open equilibrium valve.

In another example, the opening may occur actively, i.e., automatically in response to a signal or as the result of operator action.

In another example, the reactor vessel may be contained within a molten salt reactor, and more particularly, a molten salt research reactor.

In another example, the reactor vessel may be contained within a molten salt research reactor and more particular, a thermal molten salt research reactor. Once draining is initiated within the systems, reactors or methods disclosed herein, it may proceed to completion. Within the drain tank, passive cooling of decay heat can occur indefinitely through natural convention and radiant heat transfer.

In addition to the example aspects described above, further aspects and examples will become apparent by reference to the drawings and by study of the following description.

BRIEF DESCRIPTION OF THE DRAWINGS

FIG. 10 depicts a table indicating an example status of certain valves of the molten salt reactor system of FIG. 2 during a normal operating condition.

FIG. 12 depicts a table indicating an example status of certain valves of the equalization system of FIGS. 11A-11E during shutdown events associated with the molten salt reactor system of FIG. 2.

Figure 1A:
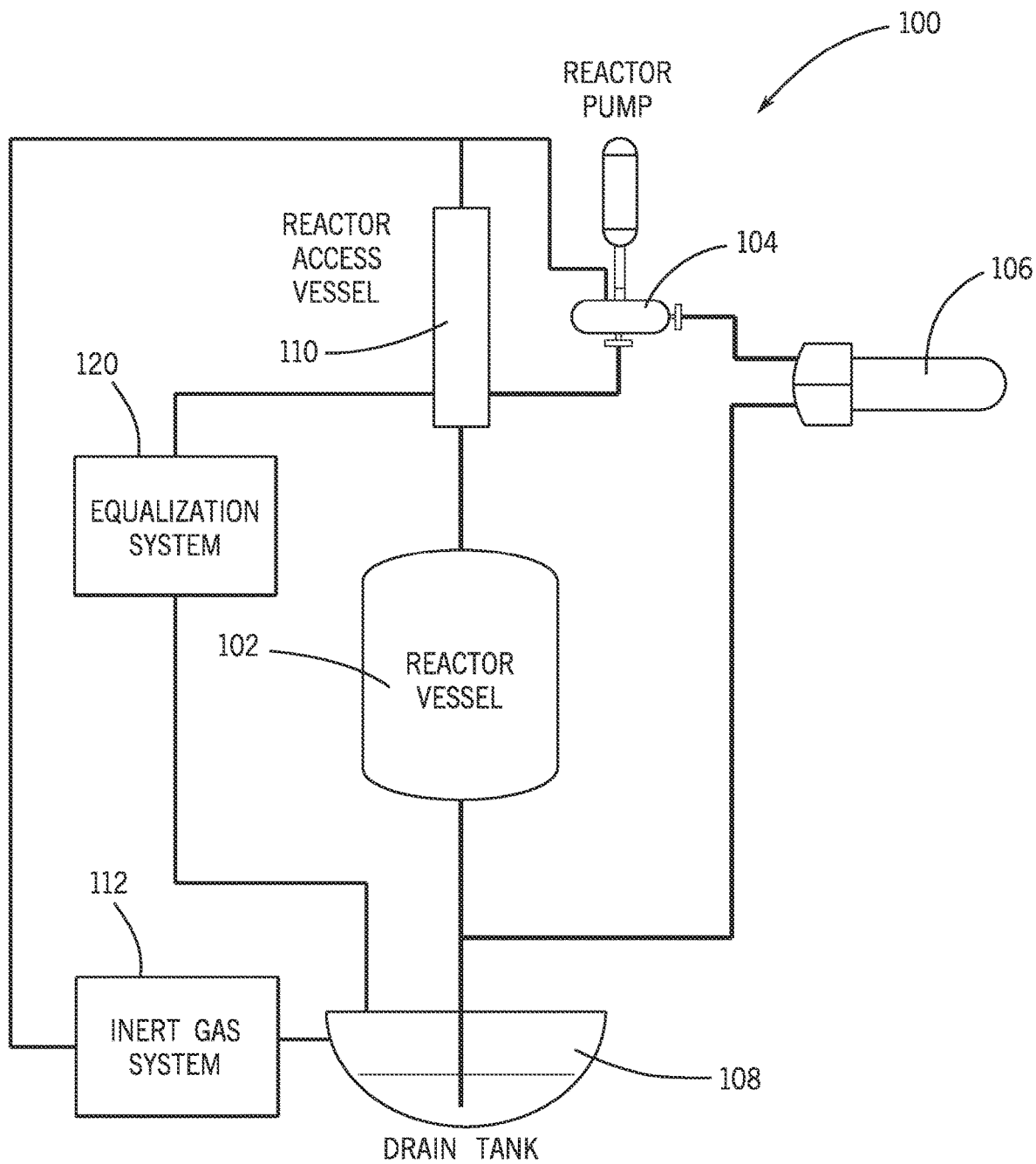
FIG. 1A depicts an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to molten salt reactor systems, such as those that are operable to depressurize in a fail-safe or walk-away safe manner. For example, and as described herein, the molten salt reactor system may use redundant drain lines to facilitate rapid and walk-away safe shutdown operations, including with respect to draining in at least four ways—three equalization lines as well as through the low pressure inert gas tank. A molten salt system may broadly include a collection of components configured to circulate a molten fuel salt along a fuel salt loop. For example, a molten salt reactor system may operate by circulating a molten fuel salt between a reactor vessel (within which fission occurs) and a heat exchanger (for the removal of heat from the fuel salt). Upon shutdown of the molten salt reactor system, it may be necessary to remove the molten fuel salt from the fuel salt loop, such as removing the fuel salt from the reactor vessel, heat exchanger and other associated components of the system. In this regard, example molten salt reactor systems may include a drain tank or other vessel or receptacle elevationally below the fuel salt loop that is configured to receive a gravitational flow of the fuel salt upon shutdown. Conventional drain tanks remain isolated from the fuel salt loop by a plug of frozen salt (a "freeze plug") which is kept actively cooled during operation of the reactor system in order to maintain isolation of the fuel salt loop and the drain tank. While freeze plugs are operable to melt upon cessation of active cooling so that the molten salt can be drained into the drain tank, such freeze plugs may not melt in a reliable, safe or timely manner, thereby hindering the safety of conventional molten salt systems.

To mitigate these and other challenges, the molten salt reactor systems of the present disclosure do not use a freeze plug to isolate the molten fuel salt from the drain tank. Rather, the molten salt reactor systems of the present disclosure include an inert gas system that operates to pressurize the drain tank during normal operations (e.g., operations other than a shutdown state) such that the molten fuel salt is restricted from flowing into the drain tank. In this regard, the various molten salt reactor systems disclosed herein may be configured in a manner to rapidly transition from an operational state (during which fission occurs) and a shutdown state (during which the system initiates cessation of fission). For example, the molten salt reactor systems disclosed herein may be configured to, upon the occurrence of a shutdown event, depressurize the drain tank and allow the molten fuel salt to flow gravitationally into the drain tank.

The molten salt reactor systems described herein may permit drainage of the molten salt reactor about 20×, about 15×, about 10×, or about 5× faster than drainage systems known in the art, e.g., drainage systems comprising a freeze plug or valve. In some cases, the molten salt reactor systems may permit the molten salt reactor to be subcritical (i.e., about 75% drained) about 20×, about 15×, about 10×, or about 5× faster than drainage systems known in the art, e.g., drainage systems comprising a freeze plug or valve. Further, the molten salt reactor systems described herein may permit drainage of the molten salt reactor in less than about 20 minutes, less than about 18 minutes, less than about 16 minutes, less than about 14 minutes, less than about 12 minutes, less than about 10 minutes, less than about 8 minutes, less than about 6 minutes, less than about 4 minutes, less than about 2 minutes or about 1 minute or less.

To facilitate the foregoing, the molten salt reactor systems of the present disclosure may include a fuel salt system configured to circulate the molten salt the through the molten salt loop, including through the reactor vessel and the heat exchanger described herein. The molten salt reactor system may further include an inert gas system fluidically coupled with the fuel salt system and configured to maintain a pressurized volume in the drain tank by circulating an inert gas (such as Helium) along a first inert gas flow path. For example, the inert gas system may supply the inert gas to a head space of the drain tank using an inlet pipe segment associated with the first flow path. The inert gas system may further receive or relieve the inert gas from the head space of the drain tank using an outlet pipe segment associated with the first flow path. As described in greater detail below, the inert gas may be supplied using a variety of components, including being supplied from an inert gas vessel having pressurized inert gas that is pressurized by operation of a compressor.

The inert gas system may further operate, among other functions, to maintain a gas seal at a reactor pump by circulating the inert gas along a second inert gas flow path. The reactor pump may be configured to drive the molten salt along the molten salt loop. For example, the inert gas system may supply the inert gas to a seal of the reactor pump using an inlet pipe segment associated with the second flow path. The inert gas system may further receive or relieve the inert gas from the reactor pump bowl head space using an outlet pipe segment associated with the second flow path. The inert gas system may further operate to supply an inert gas to a head space of various other components of the molten salt reactor system, and to relieve the inert gas from the head space of such components, including the reactor access vessel, as described herein.

Upon a shutdown event, the molten salt reactor system is configured to allow the molten fuel salt to rapidly flow into the drain tank by equalizing the pressure between the head space of the drain tank and the head space of the reactor vessel. The molten salt reactor system is further configured to isolate the inert gas and the inert-gas pressurized components from the head space of the reactor vessel and the head space of the drain tank. The isolation of the inert gas reduces the presence or build up of inert gas into the respective head spaces which could otherwise impede the draining of the molten fuel salt into the drain tank. In one example, to facilitate the foregoing, the molten salt reactor system includes an equalization system having multiple pairs of fail-open, series arranged equilibrium control valves (each pair of valves being in parallel with the other pairs) fluidically coupling the head space of the reactor vessel and the head space of the drain tank. Upon a shutdown event, the equilibrium control valves transition from a closed configuration to an open configuration. In the open configuration, the equilibrium valves are opened to establish a fluidic coupling of the respective head spaces of the drain tank and the reactor vessel. Such fluidic coupling may thus cause the head space pressures of the reactor vessel and the drain tank to equalize, thereby allowing the fuel salt to flow into the drain tank. In turn, the inert gas system may cease flow of inert gas into the head space of the reactor vessel, the drain tank, and the head space of various other components of the molten salt reactor system, thereby mitigating inert gas from again pressurizing the respective head spaces, which would otherwise cause the molten fuel salt to drain slowly.

Turning to the drawings, for purposes of illustration, FIG. 1A depicts a schematic representation of an example molten salt reactor system 100. The molten salt reactor system 100 may implement and include the inert gas system and the equalization system, and implement any of the functionalities of each described herein. As will be understood, the example shown in FIG. 1A represents merely one example configuration of a molten salt reactor system 100 in which such inert gas systems and equalization systems may be utilized. It will be understood that the inert gas systems and the equalization systems described herein may be used in and with substantially any other configuration of the molten salt reactor, as contemplated herein.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be $LiF$—$BeF_2$—$UF_4$, though other compositions of fuel salts may be utilized as fuel salts within the reactor system 100. The fuel salt within the system 100 is heated to high temperatures (about 600° C. or higher) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110. The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride ($UF_4$) to the system 100 as necessary to bring the reactor to a critical state and compensate for depletion of fissile material.

In several examples, the molten salt reactor system 100 may include an inert gas system 112 to provide inert gas to a head space of the drain tank 108, among other functions. The inert gas system 112 may further relieve inert gas from the head space of the drain tank 108 as needed. The inert gas system 112 is therefore operable to maintain pressurized inert gas in the head space of the drain tank 108 that is sufficient to substantially prevent the flow of molten fuel salt into the drain tank during normal operations (e.g., non-shutdown operations, such as those represented by the valving diagram of FIG. 10, described herein). For example, with the head space of the drain tank 108 pressurized by the inert gas system 112, molten salt may generally circulate between the reactor vessel 102 and the heat exchanger 106 without substantially draining into the drain tank 108. As described herein, the inert gas system 112 may be configured to supply inert gas to the head space of various other components of the molten salt reactor system 100, such as to the head space of the reactor access vessel 110, to the seal of reactor pump 104, among other components. Upon the occurrence of a shutdown event, the inert gas system 112 may cease providing inert gas to the head space of the drain tank 108, and other components to which the system 112 supplies inert gas.

The molten salt reactor system 100 may further include an equalization system 120 that is operable to equalize the pressure among all headspace of the system 100, including, without limitation, the head space of the drain tank 108 and the reactor vessel 102 upon the occurrence of a shutdown event. For example, during normal operation, a pressure differential exists between the head space of the drain tank 108 and the reactor vessel 102. Such pressure differential prevents or impedes the draining of the fuel salt into the drain tank 108. In this regard, the equalization system 120 may be operable to fluidically couple (via opening one or more valves) the head space of the drain tank 108 and the reactor vessel 102 to reduce or eliminate the pressure differential, thereby allowing the fuel salt to readily flow into the drain tank upon the shutdown event. As described in greater detail herein, the equalization system 120 may include numerous redundances and/or bypasses in order to facilitate a fail-safe or walk-away safe operation with respect to depressurization of the system 100.

Figure 1B:
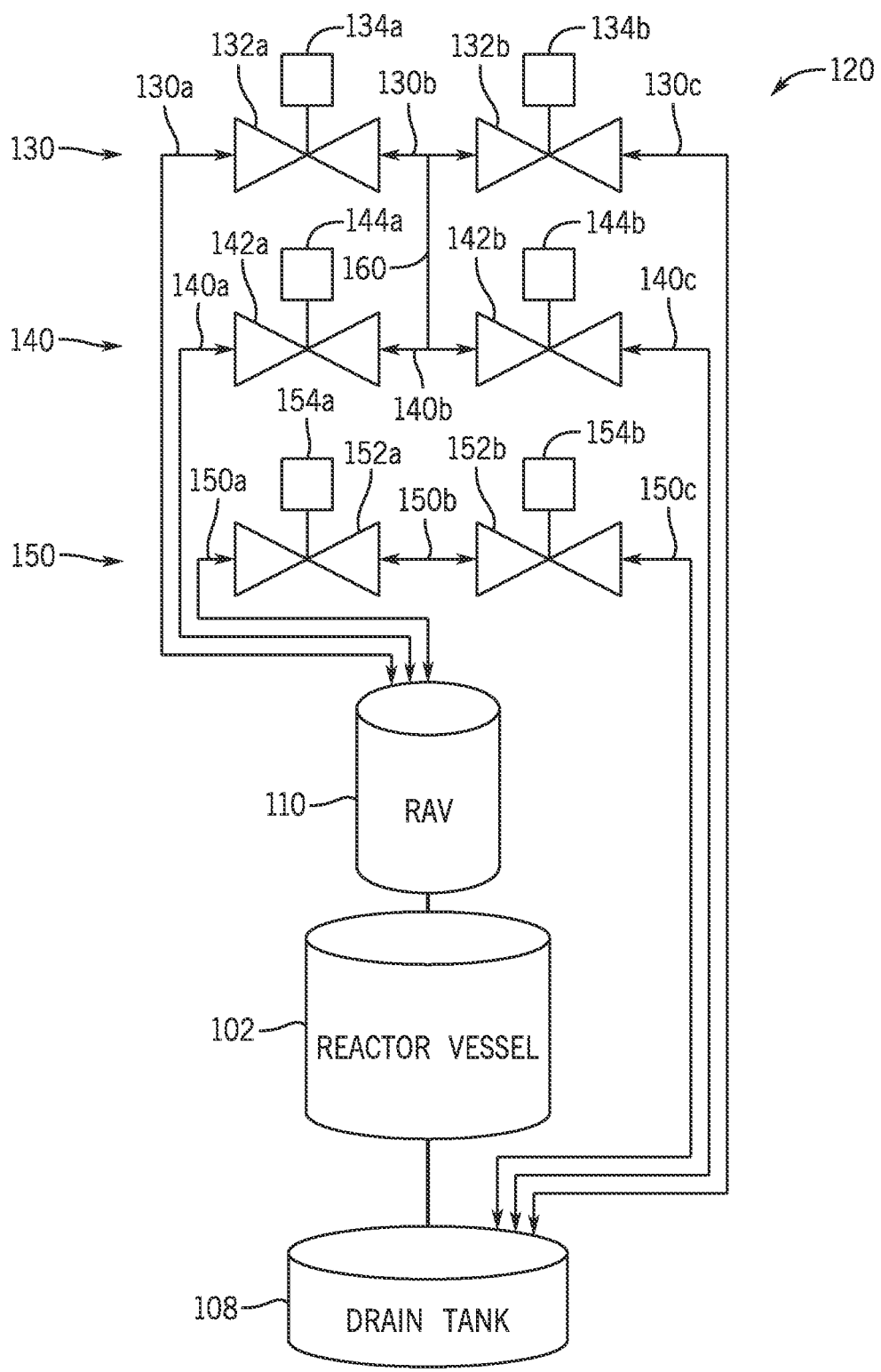
FIG. 1B depicts an example equalization system of the molten salt reactor system shown in relation to FIG. 1A.

It will be appreciated that the molten salt reactor system 100 and associated inert gas system 112 and equalization system 120 may include any of a variety of appropriate collections of mechanical components, instruments, controls, and so on in order to perform the functions described herein. With reference to FIG. 1B, example components of the equalization system are depicted that operate to equalize a headspace pressure of the reactor vessel 102 and the drain tank 108 in response to a shutdown event. In other configurations, different components of the equalization system are possible and contemplated and described herein, such as that shown in FIG. 1C. In the example of FIG. 1B, the equalization system 120 is shown as including three distinct equalization flow paths that define independent flow paths that can operate to fluidically couple the headspaces of the reactor vessel 102 and the drain tank 108: a first equalization path 130, a second equalization path 140, and a third equalization path 150. It will be appreciated that each of the equalization paths 130, 140, 150 are shown schematically, and for purposes of example; in operation, the system 100 may include additional or different equalization paths, connections, and piping, which may have different dimension or configurations than the example shown in FIG. 1B. During operation of the reactor vessel 102 (e.g., during a critical state in which the reactor vessel 102 operates to facilitate fission reactions therein), each of the equalization paths 130, 140, 150 may remain closed, which may support the maintenance of a pressurized volume in the drain tank 108 that prevents molten salt from draining thereto during such operation. On a shutdown event (e.g., a loss of power event, a safety event, or other event in which it is desirable to transition the molten salt to a subcritical state for holding in the drain tank 108), a portion of one or more of the equalization paths 130, 140, 150 may fluidically open, thereby establishing a fluid coupling of the headspaces of the reactor vessel 102 and the drain tank 108 that causes the molten salt to drain into the drain tank 108.

To facilitate the foregoing, the first equalization path 130 is shown as including flow lines 130a, 130b, 130c that generally extend and fluidically couple with the reactor access vessel 110 and the drain tank 108. The flow lines 130a, 130b may be fluidically coupled by a fail-open valve 132a, which may be actuated by controller 134a. The flow lines 130b, 130c may be fluidically coupled by a fail-open valve 132b, which may be actuated by controller 134b. In operation, and as described below in greater detail in FIG. 11A-12, on opening of each of the fail-open valves 132a, 132b, which are arranged in series, the first equalization path 130 may be opened to equalize pressure between the head space of the drain tank 108 and the reactor vessel 102.

As further shown in FIG. 1B, the second equalization path 140 is shown as including flow lines 140a, 140b, 140c that generally extend and fluidically couple with the reactor access vessel 110 and the drain tank 108. The flow lines 140a, 140b may be fluidically coupled by a fail-open valve 142a, which may be actuated by controller 144a. The flow lines 140b, 140c may be fluidically coupled by a fail-open valve 142b, which may be actuated by controller 144b. In operation, and as described below in greater detail in FIG. 11A-12, on opening of each of the fail-open valves 142a, 142b, which are arranged in series, the second equalization path 140 may be opened to equalize pressure between the head space of the drain tank 108 and the reactor vessel 102.

As further shown in FIG. 1B, the equalization system includes a cross-over 160. The cross-over fluidically couples the flow lines 130b, 140b to one another. The cross-over 160 therefore establish additional equalization pathways in the event that one of the fail-open valves 132a, 132b, 142a, 142b does not open. For example, and as described in greater detail below in FIGS. 11A-12, the cross-over 160 may permit the equalization of pressure between the head space of the drain tank 108 and the reactor vessel 102 via the fail-open valves 132a and 142b. As a further example, the cross-over 160 may permit the equalization of pressure between the head space of the drain tank 108 and the reactor vessel 102 via the fail-open valves 142a and 132b.

As further shown in FIG. 1B, the third equalization path 150 is shown as including flow lines 150a, 150b, 150c that generally extend and fluidically couple with the reactor access vessel 110 and the drain tank 108. The flow lines 150a, 150b may be fluidically coupled by a fail-open valve 152a, which may be actuated by controller 154a. The flow lines 150b, 150c may be fluidically coupled by a fail-open valve 152b, which may be actuated by controller 154b. In operation, and as described below in greater detail in FIG. 11A-12, on opening of each of the fail-open valves 152a, 152b, which are arranged in series, the third equalization path 150 may be opened to equalize pressure between the head space of the drain tank 108 and the reactor vessel 102.

Figure 1C:
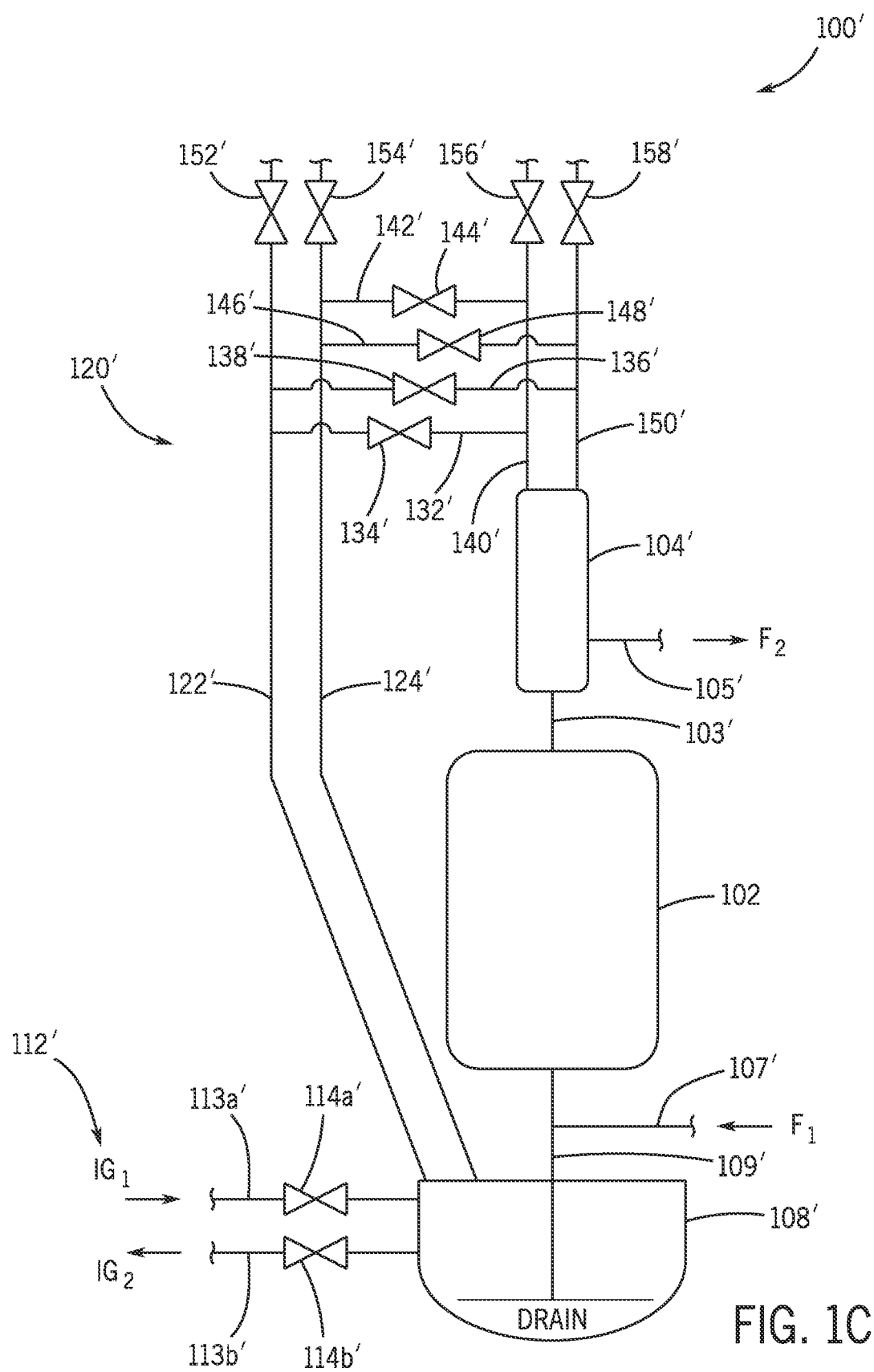
FIG. 1C depicts another example equalization system of the molten salt reactor system shown in relation to FIG. 1A.

With reference to FIG. 1C, another example of the inert gas system and the equalization of the present disclosure is shown, an inert gas system 112' and an equalization system 120' within an example system 100'. In other configurations, different components of the inert gas system and the equalization system are possible and contemplated and described herein. In the example of FIG. 1C, the inert gas system 112' is shown as including a pipe segment 113a' including a control valve 114a'. The pipe segment 113a' may be fluidically coupled to a head space of a drain tank 108' such that the inert gas system 112' may supply a flow of inert gas $IG_1$ (which may be received from a pressurized vessel or other supply of inert gas) to the head space of the drain tank 108'. The inert gas system 112' is further shown as including a pipe segment 113b' including a control valve 114b'. The pipe segment 113b' may be fluidically coupled to the head space of the drain tank 108' such that the inert gas system may receive or relieve the inert gas from the head space as necessary and send a flow of inert gas $IG_2$ to a receiving vessel or off-gas system as appropriate. The control valves 114a', 114b' may cooperate to permit the flow of inert gas into and out from the head space as needed, including operating to cease all flow of inert gas to the head space of the drain tank 108' upon the occurrence of a shutdown event.

With further reference to FIG. 1C, the equalization system 120' is shown as including a variety of pipe segments and valves that cooperate to equalize pressure between the head space of the drain tank 108' and the head space of a reactor vessel 102'. In the example of FIG. 1C, pipe segments 122', 124' are shown fluidically coupled with the head space of the drain tank 108' and extending to respective process control valves 152', 154'. Further, pipe segments 140', 150' are shown fluidically coupled with a reactor access vessel 104' (and thus the head space of the reactor vessel 102') and extending to respective process control valves 156', 158'. One or more or all of the process control valves 152', 154', 156', 158' may be used to additionally supply inert gas to the head space of the reactor access vessel 104', the reactor vessel 102', and/or the drain tank 108'. In the example of FIG. 1C, each of the pipe segments 122', 124' may be fluidically coupled with each of the pipe segments 140', 150'. For example, pipe segment 122' may be fluidically coupled with the pipe segment 140' via a pipe segment 132' including a control valve 134'. Further, pipe segment 122' may be fluidically coupled with the pipe segment 150' via a pipe segment 136' including a control valve 138'. Further, pipe segment 124' may be coupled to the pipe segment 140' via a pipe segment 142' including a control valve 144'. Further, pipe segment 124' may be coupled to the pipe segment 150' via a pipe segment 146' including a control valve 148'.

During normal operation (e.g., operations in which the reactor is not shutdown), control valves 134', 138', 144', 148' may remain closed such that the head space of the drain tank 108' and the head space of the reactor vessel 102' remains fluidically isolated from one another. For example, during normal operation, the head space of the drain tank 108' may be pressurized with inert gas from the inert gas system 112', as described herein. Accordingly, molten salt may generally flow through the fuel salt loop, as illustrated in FIG. 1C, along pipe segment 107' from flow $F_1$, though the reactor vessel 102', through pipe segment 103', through the reactor access vessel 104', and through pipe segment 105' at flow $F_2$. It will be appreciated that the fuel salt may circulate from $F_2$ through a reactor pump, heat exchanger, and/or other components, and then return to the reactor vessel at flow $F_1$. The higher pressure in the head space of the drain tank 108' (as compared with the reactor vessel 102') impedes the fuel salt from flowing into the drain tank 108'. That is, the fuel salt travels from the pipe segment 107' and into the reactor vessel 102' during normal operation.

Upon a shutdown event, one or more or all of the valves 134', 138', 144', 148' may be opened. Upon the opening of one or more or all of the valves 134', 138', 144', 148', the head space of the drain tank 108' may be in fluid communication with the head space of the reactor vessel 102'. Once in fluid communication, the pressure of the head space of the drain tank 108' may equalize with the pressure of the head space of reactor vessel 102'. With such pressurize equalized (and the inert gas system 112' no longer supplying pressurized gas to the drain tank, as described above), the fuel salt may no longer be impeded from flowing into the drain tank 108, thereby causing the fuel salt to drain rapidly into the drain tank, for example through connecting pipe 109', as described herein.

It will be appreciated that four valves (i.e., valves 134', 138', 144', 148') are provided in the equalization system of FIG. 1C for purposes of redundancy. By providing multiple valves, the equalization system may establish multiple avenues or flow paths through which the pressure may be equalized between the head spaces of the drain tank 108' and the reactor vessel 102'. While four such valves are shown in FIG. 1C, in other examples, more or fewer valves may be provided that are capable of operating to establish fluid coupling between the drain tank 108' and the reactor vessel 102'. Additionally, one or more or all of the valves 134', 138', 144', 148' may be "fail-open" valves, which may further support the rapid depressurization of the system in the event of a loss of power. For example, such valves may have a spring or are otherwise biased toward an open position and are held closed by an electrical actuation mechanism, as one example. In this regard, upon loss of system power or other reason (including malfunctioning of the valves), such valves would be encouraged toward an open position, which would permit the establishment of the fluid coupling between the drain tank 108' and the reactor vessel 102' such that the fuel salt could drain into the drain tank 108'. Additionally, and as described in greater detail below in relation to FIG. 15, one or more or all of the valves 134', 138', 144', 148' may be associated with a bypass system such that even if such valves malfunctioned in a manner which caused the valve to remain closed, in a shutdown event, the flow could bypass the respective valve in order to permit the establishment of the fluid coupling between the drain tank 108' and the reactor vessel 102' such that the fuel salt could drain into the drain tank 108'.

Figure 2:
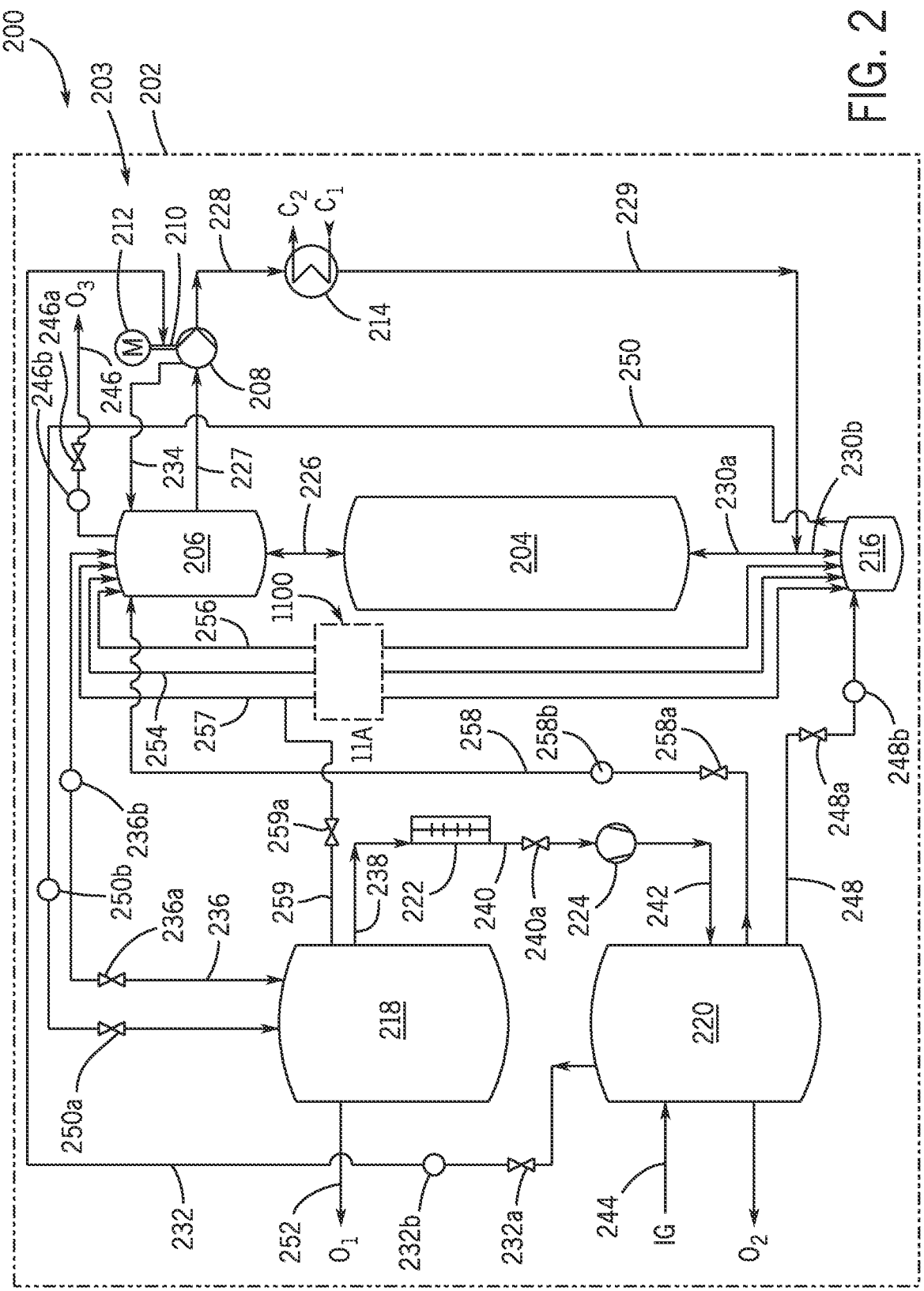
FIG. 2 depicts a piping and instrumentation diagram of another example molten salt reactor system.
Figure 3:
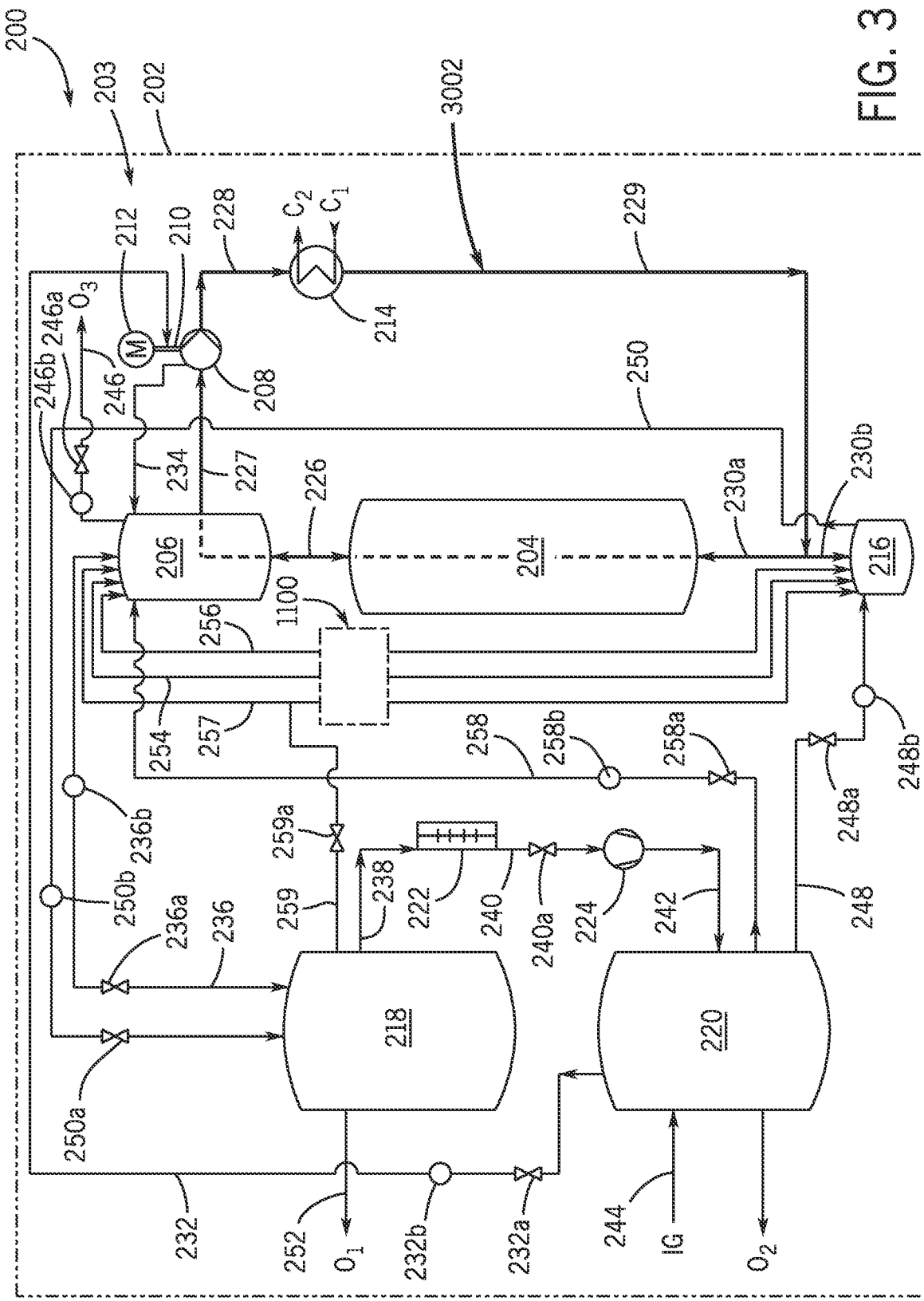
FIG. 3 depicts a flow path along the piping and instrument diagram of the molten salt reactor system of FIG. 2 indicative of a molten salt loop.

Turning to FIG. 2, a piping and instrumentation diagram of another example molten salt reactor system 200 is shown. The molten salt reactor system 200 may be substantially analogous to the molten salt reactor systems shown in FIGS. 1A—1C, and include a reactor vessel 204, a reactor access vessel 206, a reactor pump 208, a heat exchanger 214, all of which are situated along and cooperating to define a fuel loop for molten salt of the system 200. The fuel loop is contained within a reactor enclosure 202 that defines a containment volume 203. For example, and as illustrated in FIG. 3, during a normal operation, molten salt may flow along a molten salt loop 3002 from the reactor vessel 204, through a pipe segment 226, through the reactor access vessel 206, through a pipe segment 227, through reactor pump 208, through pipe segment 228, through heat exchanger 214, through pipe segment 229, and through pipe segment 230a for return to the reactor vessel 204. Molten salt may be encouraged to circulate through the molten salt loop 3002 via operation of the reactor pump 208. The reactor pump 208 may be driven by a motor 212 which is operably associated with a pump bowl head space through a reactor seal 210. As described in greater detail herein, the reactor seal 210 may be a gas seal that is maintained using inert gas provided by the inert gas system of the molten salt reactor system 200. Heat may be removed from the molten salt of the molten salt loop 3002 via the heat exchanger 214, which is shown associated with coolant inflow Ci and coolant outflow Ca.

Figure 4:
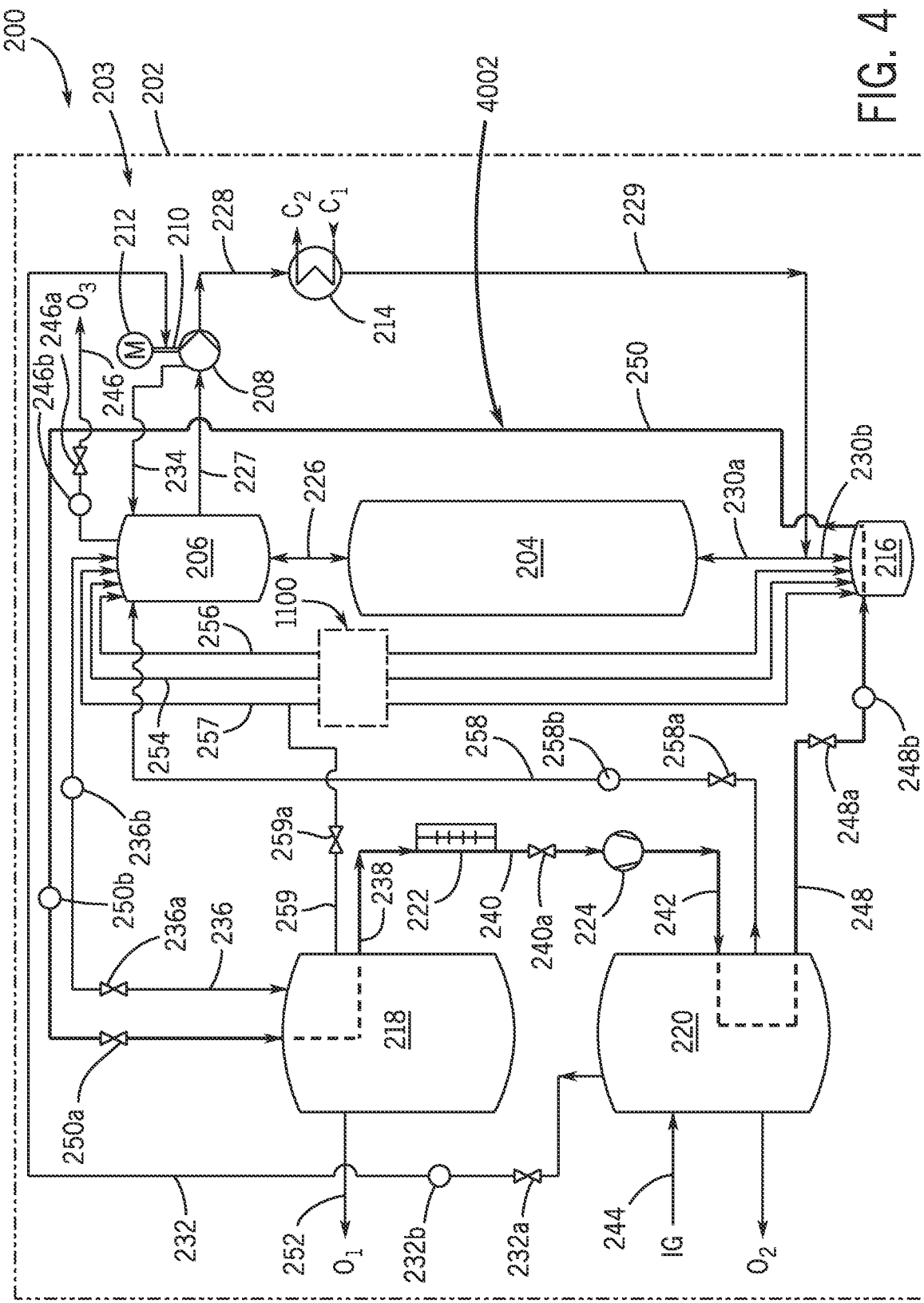
FIG. 4 depicts another flow path along the piping and instrument diagram of the molten salt reactor system of FIG. 2 indicative of an inert gas flow path.

During operation of the system 200, the molten salt of the molten salt loop 3002 may be maintained in circulation through the molten salt loop 3002, in part, due to the pressurization of inert gas in a drain tank 216, which is fluidically coupled with the molten salt loop 3002 via a pipe segment 230b. With reference to FIG. 4, the molten salt system 200 may, in one example, operate to pressurize the head space of the drain tank 216 using inert gas flow path 4002. The inert gas flow path provides for controlling the flow of inert gas with respect to the head space of the drain tank 216. For example, FIG. 4 shows a pipe segment 248 including an operating valve 248a and a pressure control valve 248b that operate to deliver a supply of inert gas to the head space of the drain tank 216. Further, a pipe segment 250 is shown including an operating valve 250a and a pressure control valve 250b that operate to allow a relief or release of inert gas from the head space of the drain tank 216.

In the example of FIG. 4, the molten salt reactor system 200 may be operable to recirculate and repressurize the inert gas such that pressurized inert gas may be continually supplied to the head space of the drain tank 216 as needed. For example, the inert gas may flow from the pipe segment 250 into a low pressure inert gas vessel 218. The low pressure inert gas vessel 218 may operate to receive various flows of inert gas from throughout the molten salt reactor system 200, as described herein, for subsequent pressurization and circulation through the system 200. The inert gas flow path 4002 may proceed from the low pressure inert gas vessel 218, through pipe segment 238 to heat exchanger 222.

The heat exchanger 222 may be operable to cool the inert gas coming from the low pressure inert gas vessel 218, which in some cases, may be optional. The inert gas flow path 4002 may proceed from the heat exchanger 222 through pipe segment 240 (including operating valve 240a) to compressor 224. The compressor 224 may be operable to increase a pressure of the inert gas, such as increasing a pressure of the inert gas to around 50 psig. In other cases, the compressor 224 may be operable to increase the pressure of the inert gas by a greater or lesser amount, based on the capacity of the compressor 224 and the operational pressure needs of the system 200. The inert gas flow path 4002 may proceed from the compressor 224 and into a high pressure inert gas vessel 220 via a pipe segment 242. The high pressure inert gas vessel 220 may operate as a holding vessel that contains a supply of pressurized inert gas for subsequent delivery to the various head spaces of the molten salt reactor system 200 that are supplied with pressurized inert gas. The inert gas flow path 4002 may proceed from the high pressure inert gas vessel 220 through the pipe segment 248 (including the operating valve 248a and the pressure control valve 248b) for delivery of the pressurized inert gas into the head space of the drain tank 216.

In one example, it may be desirable to maintain the headspace of the drain tank 216 at a pressure of around 30 psig. In this regard, the molten salt reactor system 200 may operate to supply pressurized gas to the head space of the drain tank 216 via the pipe segment 248 in order to maintain the head space at a pressure of around 30 psig (or other appropriate pressure). Further, the molten salt reactor system 200 may operate to relieve pressure from the head space of the drain tank 216 as needed via the pipe segment 250.

Figure 5:
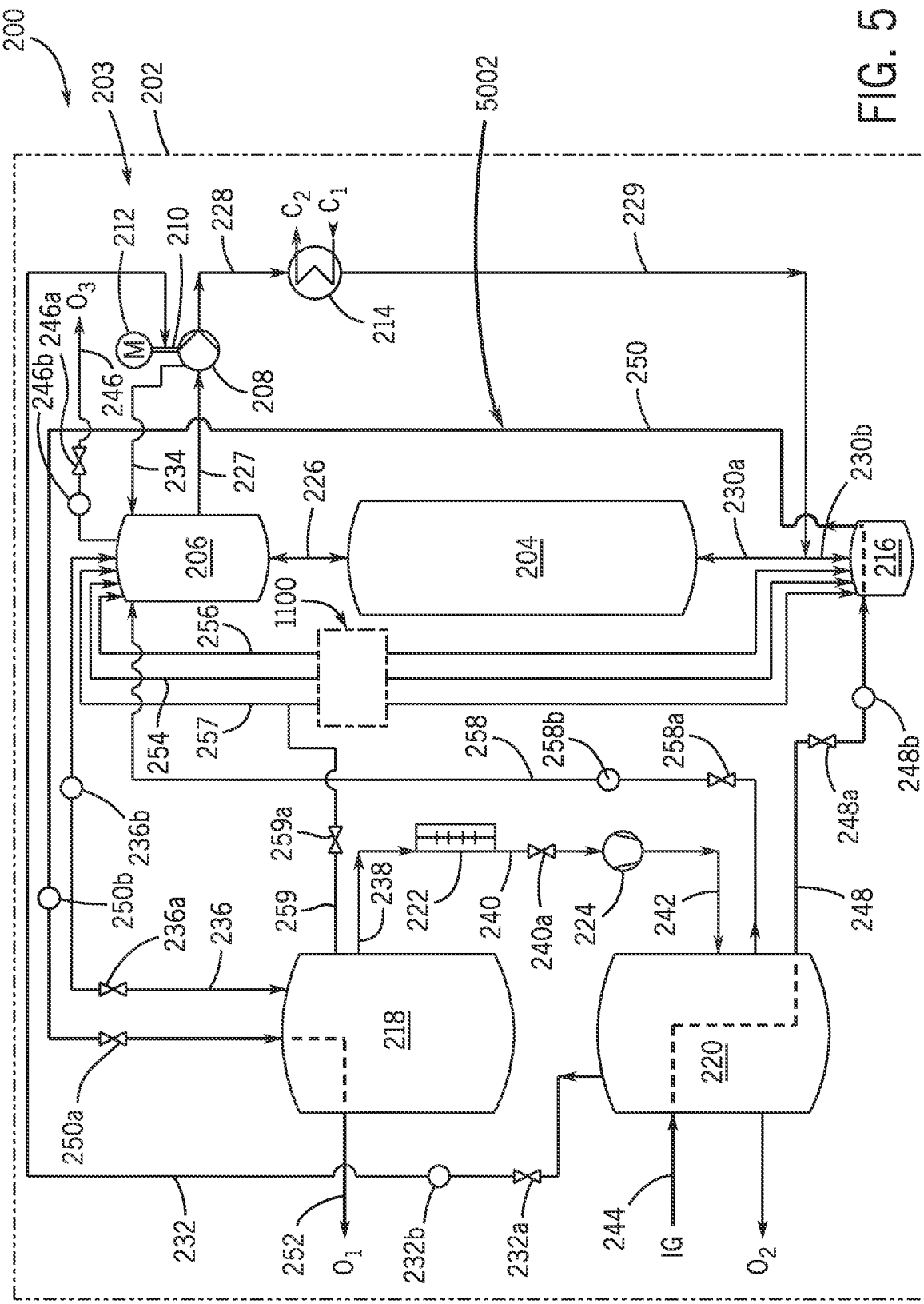
FIG. 5 depicts another flow path along the piping and instrument diagram of the molten salt reactor system of FIG. 2 indicative of another inert gas flow path.

In an alternative example, with reference to FIG. 5, the molten salt reactor system 200 may operate to pressurize the head space of the drain tank 216 without use of the compressor 224, such as may optionally be used for certain low power operations. For example, the head space of the drain tank 216 may be supplied with the inert gas via the pipe segment 248, and may be relieved of the inert gas via the pipe segment 250 in a manner substantially analogous to that described above in relation to the flow path 4002 of FIG. 4. Notwithstanding the foregoing similarities, FIG. 5 depicts an example in which the molten salt reactor system 200 is operable to supply and relieve an inert gas flow to the head space of the drain tank 216 without the use of the compressor 224, as illustrated by the flow path 5002. The inert gas flow path 5002 is depicted in FIG. 5 with an inert gas flow IG entering the high pressure inert gas vessel 220 via the pipe segment 224. The inert gas flow IG may include a flow of inert gas from an inert gas supply tank that generally is arranged outside of the reactor enclosure 202. The flow of inert gas IG may be pressurized such that the inert gas of the high pressure inert gas vessel 220 is maintained at a sufficiently high pressure to facilitate the various operations of inert gas system described herein. The inert gas flow path 5002 may proceed from the high pressure inert gas vessel 220, through the pipe segment 248 (including the operating valve 248a and the pressure control valve 248b) and into the head space of the drain tank 216. The flow path 5002 may proceed from the head space of the drain tank 216, through the pipe segment 250 (including the operating valve 250a and the pressure control valve 250a) and into the low pressure inert gas vessel 218. Rather than compressing the inert gas of the low pressure inert gas vessel 218 for recirculation, as is generally accomplished in the configuration of FIG. 4, the inert gas flow path 5002 may proceed to remove the inert gas to an off-gas system at flow $O_1$ via the pipe segment 252. It will be appreciated the molten salt system 200 may be operable to transition between a configuration in which the inert gas flow path 4002 is used to control the pressure of inert gas in the head space of the drain tank 216, and a configuration in which the inert gas flow path 5002 is used to control the pressure of the inert gas in the head space of the drain tank 216. For example, the molten salt reactor system 200 may transition to the inert gas flow path 5002 in order to perform maintenance on the compressor 224 or to otherwise bypass the compressor 224, as needed.

Figure 6:
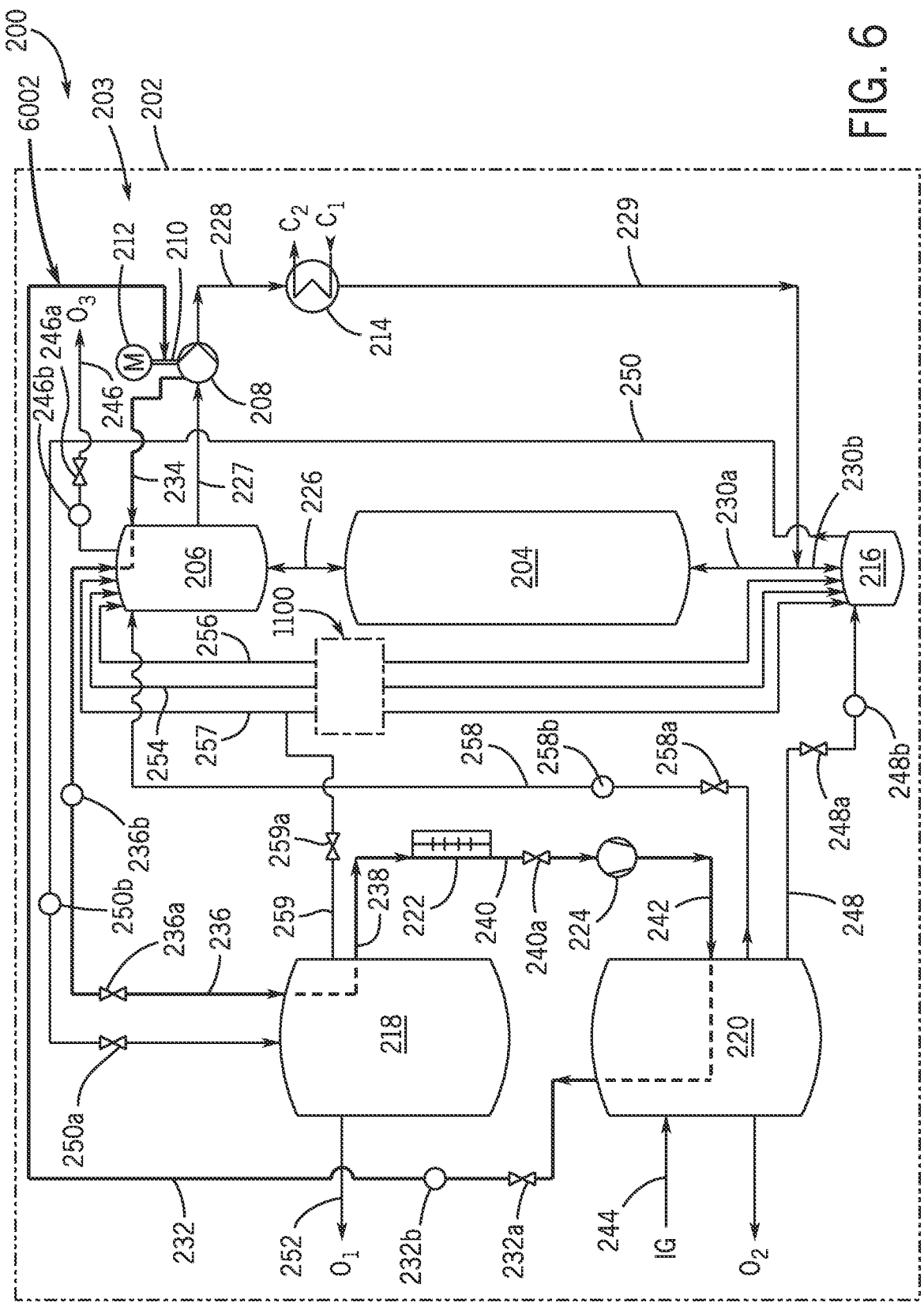
FIG. 6 depicts another flow path along the piping and instrument diagram of the molten salt reactor system of FIG. 2 indicative of another inert gas flow path.

The molten salt reactor system 200 may be further configured to control inert gas with respect to various other components of the system. For example, and as shown with reference to FIG. 6, an inert gas flow path 6002 is shown that may be used for, among other functions, providing inert gas to the reactor seal 210 of the reactor pump 208. For example, inert gas may be provided to the reactor seal 210 via a pipe segment 232 (including through operating valve 232a and pressure control valve 232b). The inert gas may be provided to the reactor seal 210 such that pressure at the reactor seal 210 is greater than the pressure in the reactor pump 208 bowl head space in order to support maintaining a seal between the bowl head space and the pump motor 212. During operation of the reactor pump 208, at least some inert gas may bleed into the pump bowl head space. In this regard, the inert gas flow path 6002 is shown as including a pipe segment 234 that permits such inert gas to bleed into the head space of the reactor access vessel 206, which in some cases may optionally include one or more operating valves. The inert gas flow path 6002 may proceed from the head space of the reactor access vessel 206, through the pipe segments 236 (including the operating valve 236a and the pressure control valve 236b) and into the low pressure inert gas vessel 218. As described above in relation to the inert gas flow path 4002, the low pressure inert gas vessel 218 may serve as a receptacle for inert gas received from various head spaces and components of the molten salt reactor system 200. In this regard, substantially analogous to the inert gas flow path 4002, the inert gas flow path 6002 may proceed from the low pressure inert gas vessel 218, through the pipe segment 238, through the heat exchanger 222, through the pipe segment 240 (including the operating valve 240a), through the compressor 224, and through the pipe segment 242 for delivery to the high pressure inert gas vessel 220. As described above in relation to the inert gas flow path 4002, the high pressure inert gas vessel 220 may serve as a holding vessel for generally high pressure inert gas within the reactor enclosure 202. In this regard, the inert gas flow path 6002 may proceed from the high pressure inert gas vessel 220, the pipe segment 232 (including the operating valve 232a and the control valve 232b) for delivery to the reactor seal 210.

Figure 7:
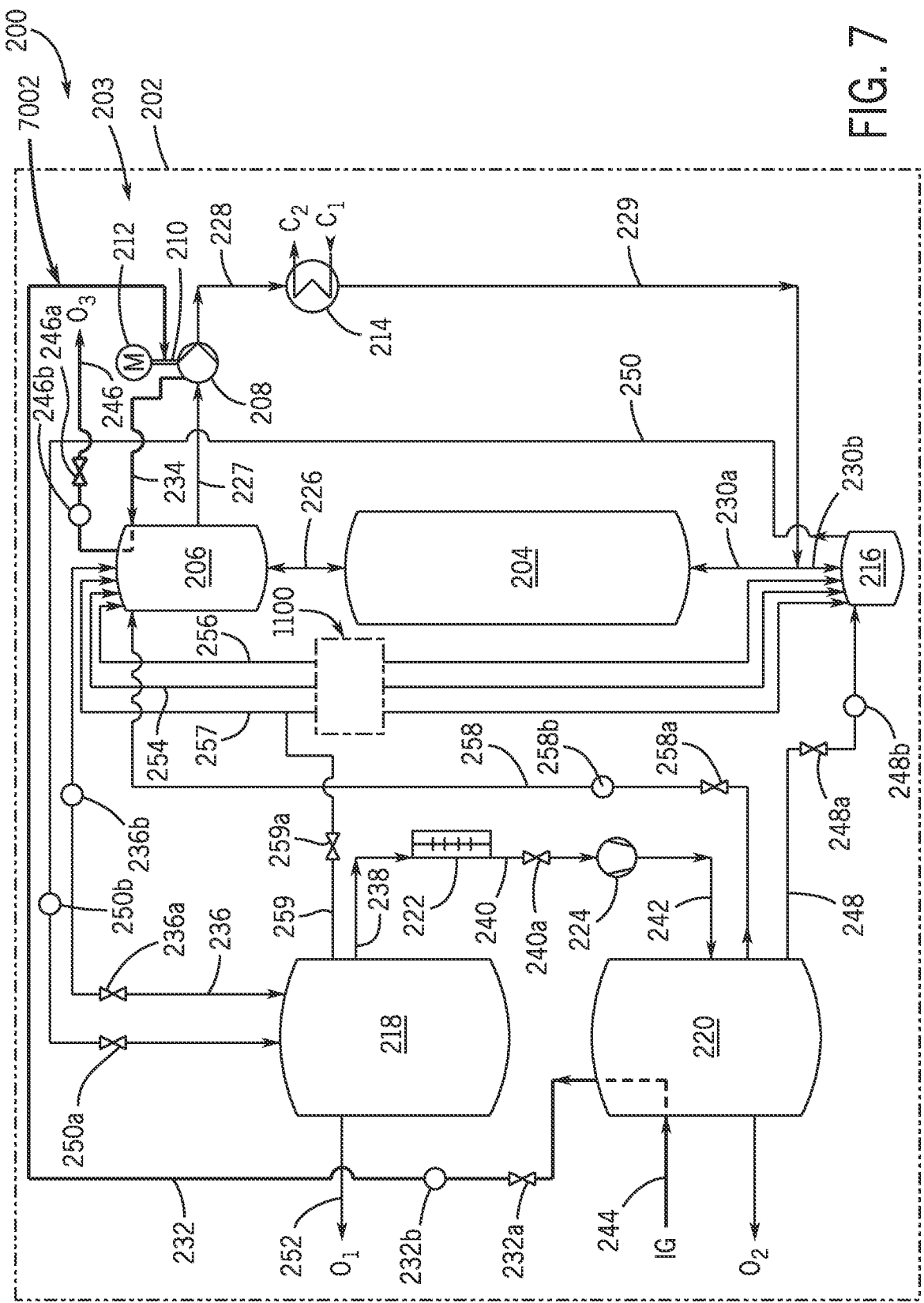
FIG. 7 depicts another flow path along the piping and instrument diagram of the molten salt reactor system of FIG. 2 indicative of another inert gas flow path.

In an alternative example, with reference to FIG. 7, the molten salt reactor system 200 may operate to pressurize the reactor seal 210 without use of the compressor 224. For example, the high pressure inert gas vessel 220 may receive a supply of pressurized inert gas flow IG from the pipe segment 244 as described above with reference to the inert gas flow path 5002. The inert gas flow path 7002 may proceed from the high pressure inert gas vessel 220, through the pipe segment 232 (including the operating valve 232a and the pressure control valve 232b) for delivery to the reactor seal 210 of reactor pump 208. As described above in relation to the inert gas flow path 6002, the inert gas may bleed from the reactor seal 210 into the pump bowl head space, and may thus be bleed from the reactor pump 208 to the head space of the reactor access vessel 206 via the pipe segment 234. Rather than circulating the inert gas from the head space of the reactor access vessel 206, as described in relation to the inert gas flow path 6002, the inert gas flow path 7002 may proceed from the head space of the reactor access vessel 206 to an off-gas system at flow $O_3$ via a pipe segment 246 (including operating valve 246a and pressure control valve 246b). It will be appreciated that the molten reactor system 200 may transition between the inert gas flow path 6002 of FIG. 6 and the inert gas flow path 7002 of FIG. 7 as needed, based in part on whether compressor 224 is used to pressurize the inert gas delivered to the reactor seal 210.

Figure 8:
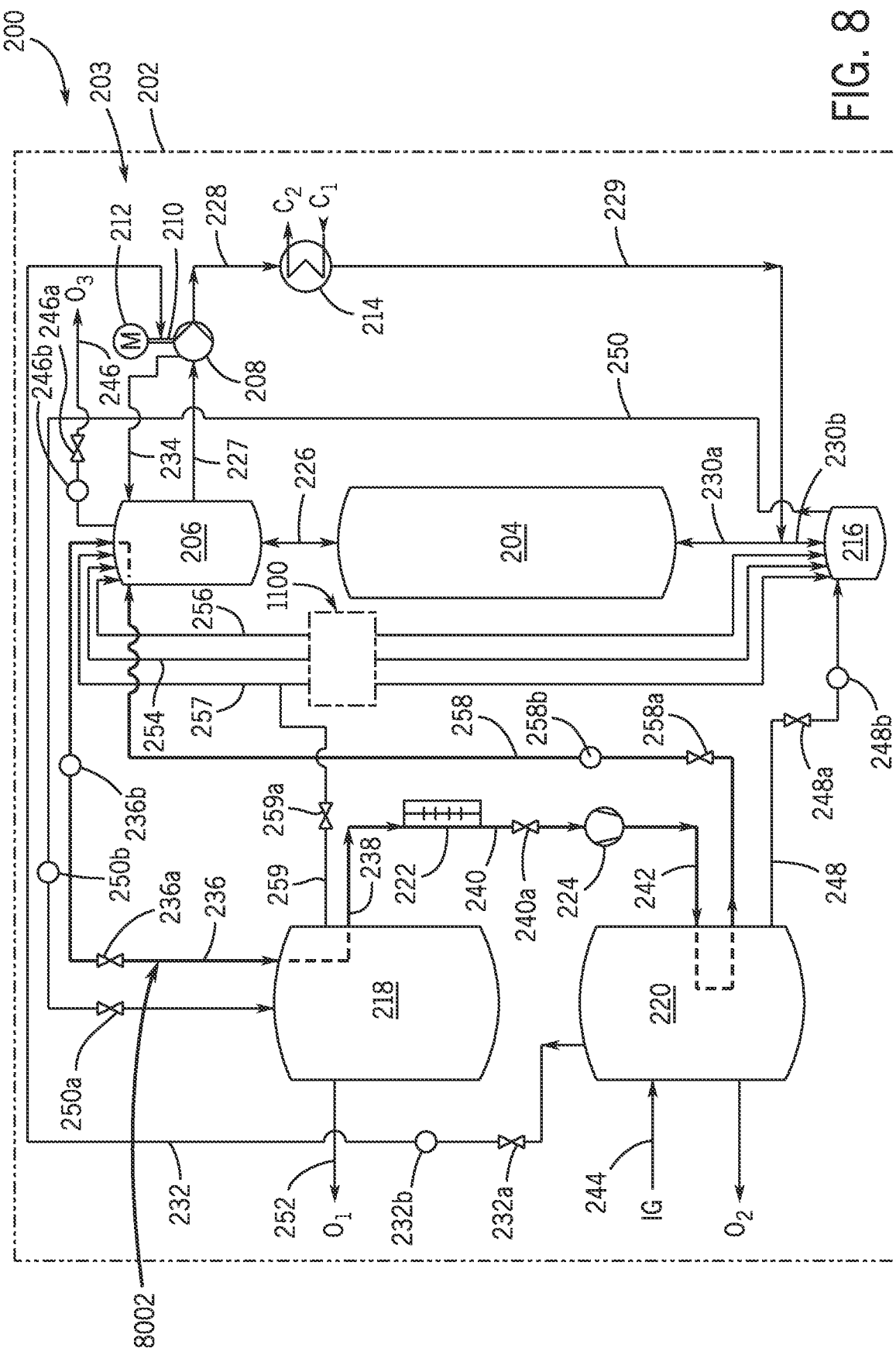
FIG. 8 depicts another flow path along the piping and instrument diagram of the molten salt reactor system of FIG. 2 indicative of another inert gas flow path.

The molten salt reactor system 200 may also be configured to control a flow of inert gas to the head space of the reactor access vessel 206. For example, and as shown with reference to FIG. 8, an inert gas flow path 8002 is shown that may be used for, among other functions, providing inert gas to the head space of the reactor access vessel 206. For example, and with reference to FIG. 8, the molten salt reactor system 200 may supply a flow inert gas along the inert gas flow path 8002 to the reactor access vessel 206 via the pipe segment 258 (including operating valve 258a and pressure control valve 258b). The molten salt reactor system 200 may relieve inert gas from the reactor access vessel 206 head space along the inert gas flow path 8002 via the pipe segment 236 (including the operating valve 236a and the pressure control valve 236b). The inert gas of the inert gas flow path 8002 may be received by the low pressure inert gas vessel 218 and pressurized and transferred to the high pressure inert gas vessel 220 via the pipe segment 238, the heat exchanger 222, the pipe segment 240 (including the operating valve 240a), the compressor 224, and the pipe segment 242. In turn, the pressurized inert gas may flow from the high pressure inert gas vessel 220, through the pipe segment 258 (including the operating valve 258a and pressure control valve 258b) for delivery to the head space of the reactor access vessel 206.

Figure 9:
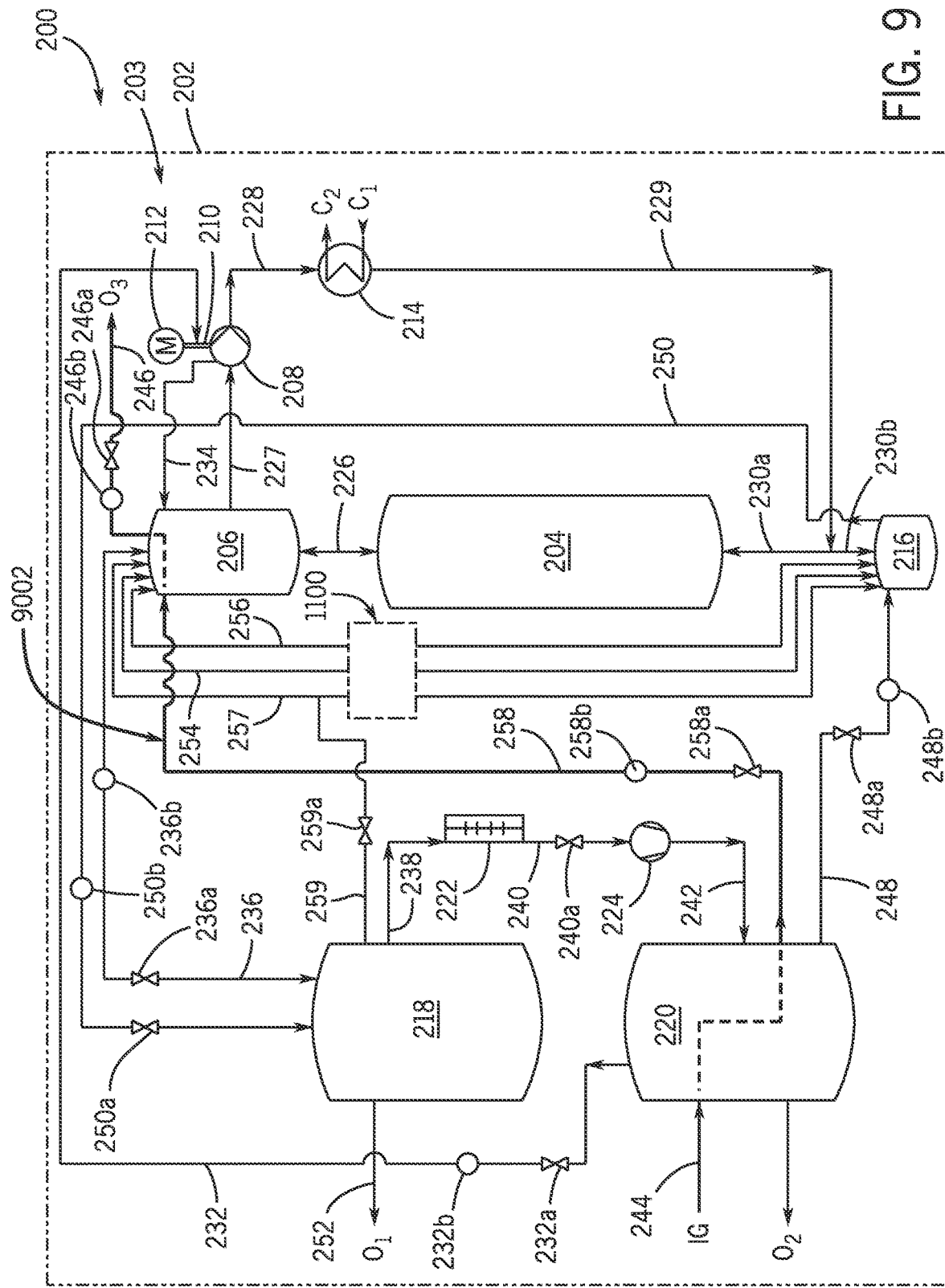
FIG. 9 depicts another flow path along the piping and instrument diagram of the molten salt reactor system of FIG. 2 indicative of another inert gas flow path.

In an alternative example, with reference to FIG. 9, the molten salt reactor system 200 may operate to control the inert gas flow to the reactor access vessel 206 head space without the use of the compressor 224. For example, the high pressure inert gas vessel 220 may receive a supply of pressurized inert gas flow IG from the pipe segment 244 as described above with reference to the inert gas flow 5002. The inert gas flow path 9002 may proceed from the high pressure inert gas vessel 220, through the pipe segment 258 (including the operating valve 258a and the pressure control valve 258b) for delivery of the inert gas to the reactor access vessel 206 head space. The inert gas from the reactor access vessel 206 may proceed to the off-gas system at flow $O_3$ via the pipe segment 246 (including operating valve 246a and pressure control valve 246b). Pipe segment 246 may be used to obtain a pure gas stream directly from the fuel-gas interface, which may have a variety of uses, including for scientific research. In other cases, the inert gas from the reactor access vessel 206 may proceed to the off-gas system at flow $O_1$ via the pipe segment 236 (including the operating valve 236a and the pressure control valve 236b), the low pressure inert gas vessel 218 and pipe segment 252. It will be appreciated that the molten reactor system 200 may transition between the inert gas flow path 8002 of FIG. 8 and the inert gas flow path 9002 of FIG. 9 as needed, based in part on whether compressor 224 is used to pressurize the inert gas delivered to the reactor access vessel 206 head space.

With reference to FIG. 10, a valving diagram 1000 is depicted corresponding to normal operations (e.g., not shut-down operations), which are generally represented by the inert gas flow paths 4002, 5002, 6002, 7002, 8002, 9002 of FIGS. 4-9. At row 1002 of chart 1000, operating valve 240a is shown as having a configuration of "closed, periodically open" during normal operation. For example, and with reference to FIGS. 4 and 6, the operating valve 240a may be used to control throughput of inert gas flow to the compressor 224. In this regard, the operating valve 240a may normally closed, but periodically opened such that inert gas may be supplied to the compressor 224 for delivery of pressurized inert gas to the high pressure inert gas vessel 220. At row 1004, operating valve 258a is shown as having a configuration of "closed, periodically open" during normal operation. For example, and with reference to FIGS. 8 and 9, the operating valve 258a may be used to control throughput of inert gas flow from the high pressure inert gas vessel 220 to the head space of the reactor access vessel 206. In this regard, the operating valve 258a may be normally closed, but periodically opened such that pressurized inert gas may be supplied to the head space of the reactor access vessel 206.

At row 1006, operating valve 246a is shown as having a configuration of "closed, periodically open" during normal operation. For example, and with reference to FIGS. 7 and 9, the operating valve 246a may be used to control the throughput of inert gas flow sent from the head space of the reactor access vessel 206 to the offset system at flow $O_3$. In this regard, the operating valve 246a may be normally closed, but periodically opened such that inert gas may be sent from the head space of the reactor access vessel 206 to the off-gas system.

At row 1008, operating valve 232a is shown as having a configuration of "open, can be closed" during normal operation. For example, and with reference to FIGS. 6 and 7, the operating valve 232a may be used to control the throughput of the inert gas flow that is delivered to the reactor seal 210 from the high pressure inert gas vessel 220. In this regard, the operating valve 232a may be normally open to supply such inert gas, but could be closed if needed.

At row 1010, operating valve 236a is shown as having a configuration of "open, can be closed" during normal operation. For example, and with reference to FIGS. 6 and 8, the operating valve 236a may be used to control the throughput of inert gas flow between the head space of the reactor access vessel 206 and the low pressure inert gas vessel 218. In this regard, the operating valve 236a may be normally open to permit the fluid coupling of the head space of the reactor access vessel 206 and the low pressure inert gas vessel 218, but could be closed if needed.

At row 1012, equalization system 1100 is shown as having a configuration of "closed" during normal operation. For example, and with reference to FIG. 2, the equalization system 1100 is arranged on pipe segments 254, 256, 257 that fluidically couples the head space of the drain tank 216 and the head space of the reactor access vessel 206, as described in greater detail below with reference to FIGS. 11A-12. In this regard, the equalization system 1100 remains closed during normal operations because the head space of the drain tank 216 must remain fluidically isolated from, and at a high pressure than, the head space of the reactor access vessel 206.

At row 1014, operating valve 250a is shown as having a configuration of "closed, periodically open" during normal operation. For example, and with reference to FIGS. 4 and 5, the operating valve 250a may be operable to control a throughput of inert gas from the head space of the drain tank 216 to the low pressure inert gas vessel 218. In this regard, the operating valve 250a remains closed during normal operations, and can be periodically opened in order to bleed or otherwise relieve pressure from the head space of the drain tank 216.

At row 1016, operating valve 248a is shown as having a configuration of "closed, periodically open" during normal operation. For example, and with reference to FIGS. 4 and 5, the operating valve 248a may be operable to control a throughput of inert gas into the headspace of the drain tank 216. In this regard, the operating valve 250a remains closed during normal operations, and can be periodically opened in order to provide pressurized inert gas to the head space of the drain tank 216 as needed.

At row 1018, off-gas flows $O_1$, $O_2$, $O_3$ are shown as having a configuration of "closed, periodically open" during normal operation. For example, and with reference to FIGS. 2, 5, 7, 9, the off-gas flows $O_1$, $O_2$, $O_3$ may be operable to route inert gas to a receptacle that is outside of the reactor containment 202. In this regard, the off-gas flows $O_1$, $O_2$, $O_3$ may typically be closed, but can be periodically opened in order to transfer inert gas to the off-gas system as needed.

At row 1020 inert gas flow IG is shown as having a configuration of "closed, periodically opened" during normal operations. For example, and with reference to FIGS. 5, 7, 9 the IG flow may be operable to route pressurized gas to the high pressure inert gas vessel 220. In this regard, the inert gas flow IG may be typically closed, but can be periodically opened in order to transfer inert gas to the high pressure inert gas vessel as needed.

In certain scenarios it may be desirable to shutdown the molten salt reactor system 200. For example, the molten salt reactor system 200 may require shutdown in the event of maintenance and/or other planned shutdown event. Further, the reactor system 200 may require shutdown in the event of an emergency shutdown scenarios, including a loss of power to the molten salt reactor system 200. In this regard, FIGS. 11A-11E depict one configuration of the equalization system 1110 of FIG. 2 in which a first equalization path 254, a second equalization path 256, and a third equalization path 257 (also shown in FIG. 2) each operate to fluidically couple the headspace of the reactor vessel 204 and the drain tank 216 in order to equalize pressures therebetween on the occurrence of a shutdown event. The first equalization path 254 may be substantially analogous to the first equalization path 130 depicted in reference to FIG. 1B, and include flow line segments 254a, 254b, 254c, operating "fail-open" control valves 263a, 263b, and controllers 265a, 265b. The first and second equalization paths may be fluidically coupled via a cross-over 160. Further, the second equalization path 256 may be substantially analogous to the second equalization path 140 depicts in reference to FIG. 1B, and include flow line segments 256a, 256b, 256c, operating "fail-open" control valves 267a, 267b, and controllers 269a, 269b. Further, the third equalization path 257 may be substantially analogous to the third equalization path 150 and include flow line segments 257a, 257b, 257c, operating "fail-open" control valves 271a, 271b, and controllers 273a, 273b.

In operation, and with reference to the valving diagram 1200 of FIG. 12, the equalization system 1100 may be operable to establish at least five distinct pathways by which the headspace pressure of the reactor vessel 204 and the drain tank 216 may be equalized, which are depicted in FIG. 12 at column 1220 ("Shutdown 1"), column 1222 ("Shutdown 2"), column 1224 ("Shutdown 3"), column 1226 ("Shutdown 4"), and column 1228 ("Shutdown 5"). For purposes of illustration, the valving diagram 1200 depicts the configuration of each operating or fail-open valve for each shutdown configuration, for example at row 1202 ("operating valve 263a"), row 1204 ("operating valve 263b"), row 1206 ("operating valve 267a), row 1208 ("operating valve 267b"), row 1210 ("operating valve 271a"), and row 1212 ("operating valve 271b").

Figure 11A:
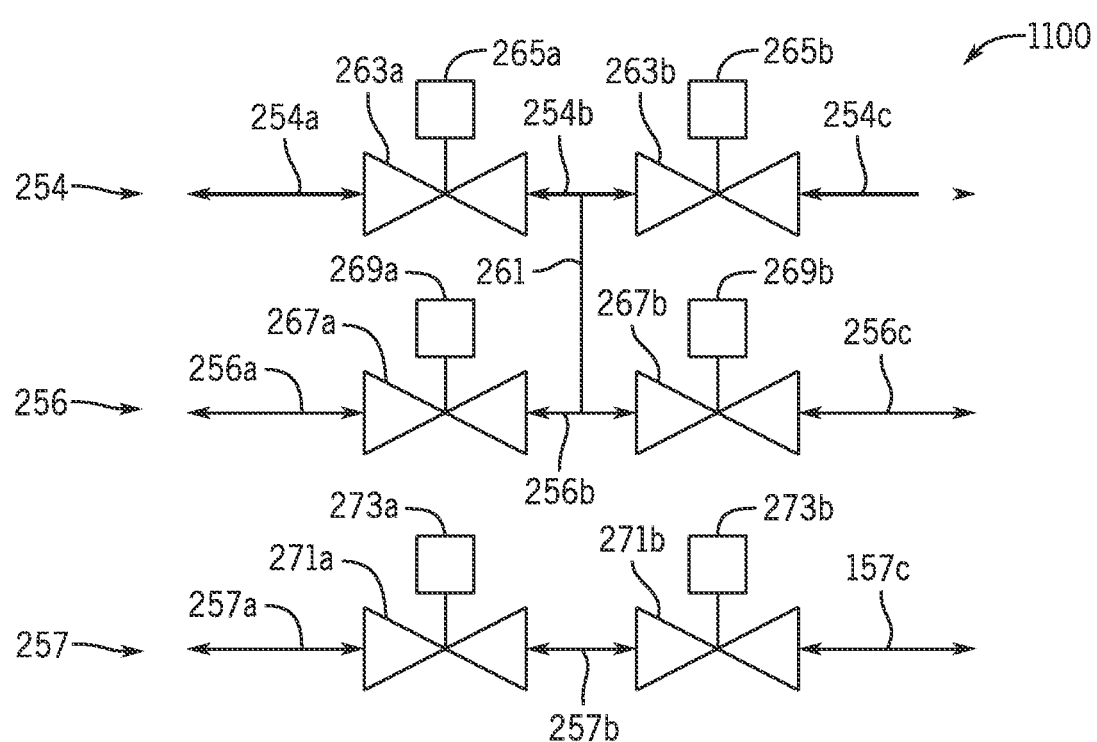
FIG. 11A depicts an equalization system of the molten salt reactor system of FIG. 2 in a first shutdown configuration.
Figure 11B:
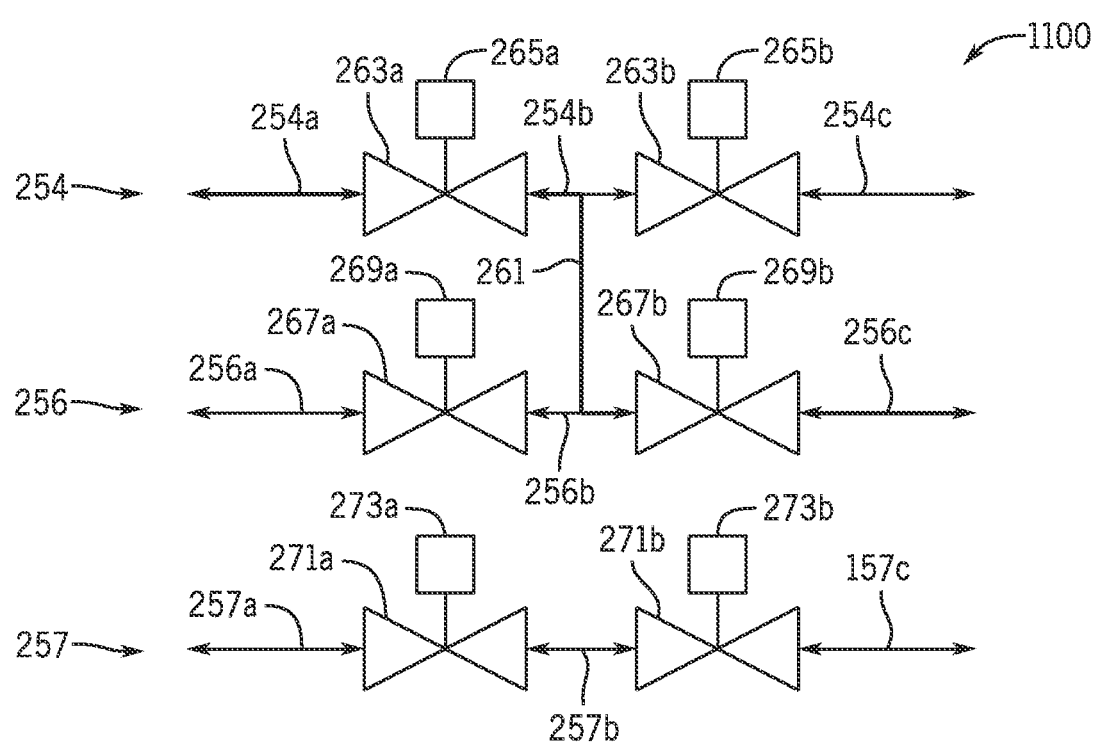
FIG. 11B depicts an equalization system of the molten salt reactor system of FIG. 2 in a second shutdown configuration.
Figure 11C:
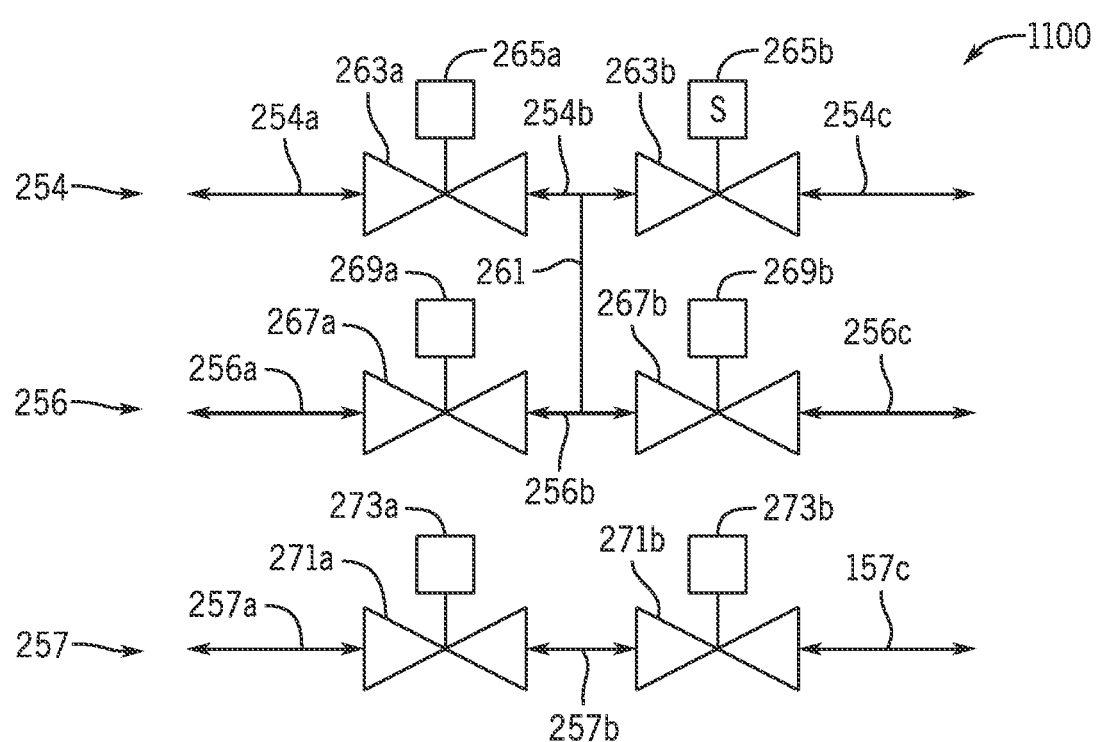
FIG. 11C depicts an equalization system of the molten salt reactor system of FIG. 2 in a third shutdown configuration.
Figure 11D:
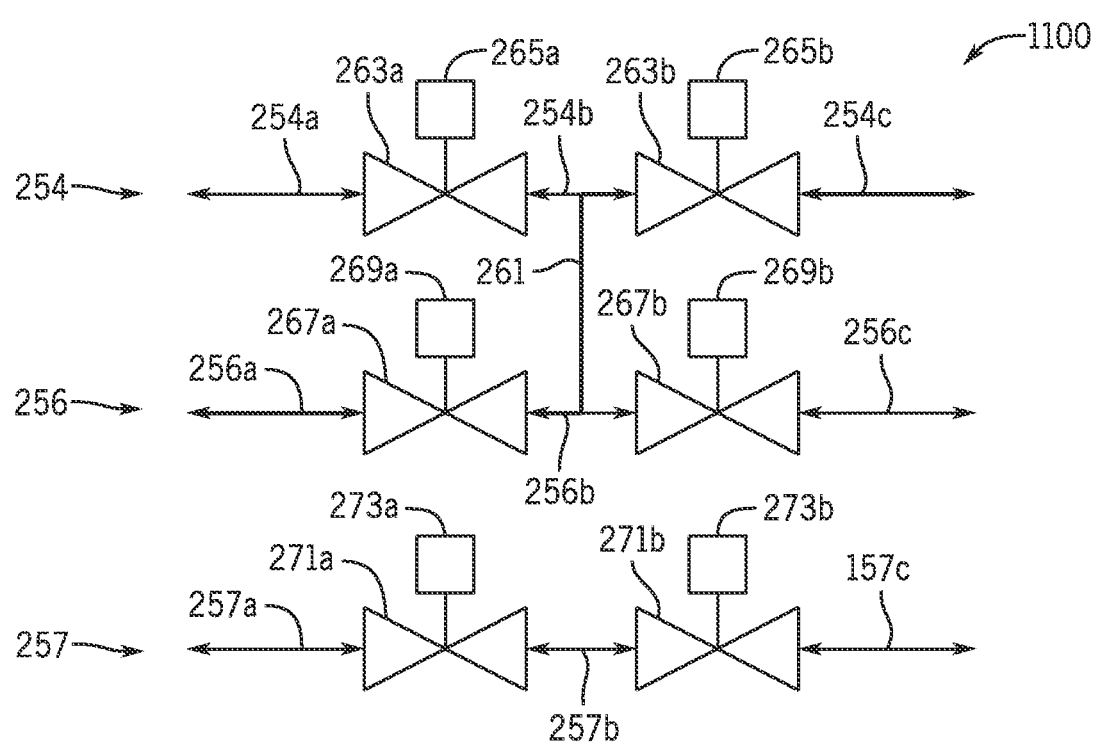
FIG. 11D depicts an equalization system of the molten salt reactor system of FIG. 2 in a fourth shutdown configuration.
Figure 11E:
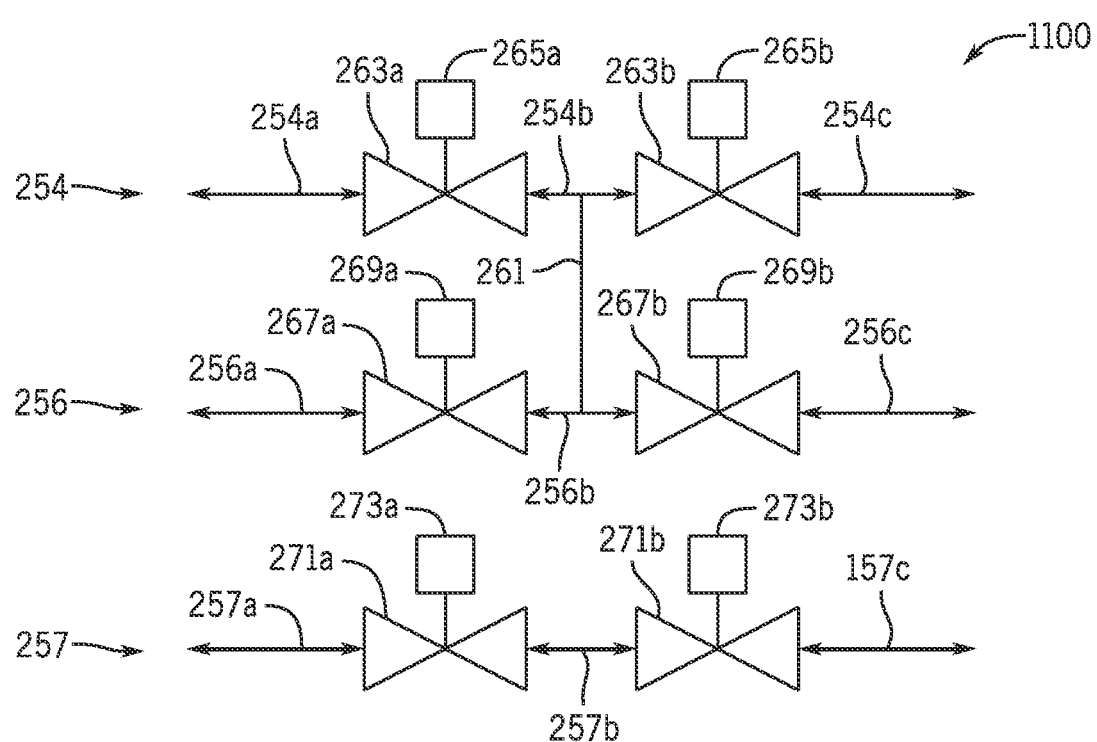
FIG. 11E depicts an equalization system of the molten salt reactor system of FIG. 2 in a fifth shutdown configuration.

In this regard, with reference to FIGS. 11A and 12, the first equalization path 254 may establish the "Shutdown 1" equalization path in which operating valve 263a is "Open," operating valve 263b is "Open," operating valve 267a is "Closed," operating valve 267b is "Closed," operating valve 271a is "Closed," and operating valve 271b is "Closed." Further, with reference to FIGS. 11B and 12, the first equalization path 254 and the second equalization path 256 may cooperate to establish the "Shutdown 2" equalization path in which operating valve 263a is "Open," operating valve 263b is "Closed," operating valve 267a is "Closed," operating valve 267b is "Open," operating valve 271a is "Closed," and operating valve 271b is "Closed." Further, with reference to FIGS. 11C and 12, the second equalization path 256 may establish the "Shutdown 3" equalization path in which operating valve 263a is "Closed," operating valve 263b is "Closed," operating valve 267a is "Open," operating valve 267b is "Open," operating valve 271a is "Closed," and operating valve 271b is "Closed." Further, with reference to FIGS. 11D and 12, the first equalization path 254 and the second equalization path may establish the "Shutdown 4" equalization path in which operating valve 263a is "Closed," operating valve 263b is "Open," operating valve 267a is "Open," operating valve 267b is "Closed", operating valve 271a is "Closed," and operating valve 271b is "Closed." Further, with reference to FIGS. 11E and 12, the third equalization path 257 may establish the "Shutdown 5" equalization path in which operating valve 263a is "Closed," operating valve 263b is "Closed," operating valve 267a is "Closed," operating valve 267b is "Closed", operating valve 271a is "Open," and operating valve 271b is "Open." It will be appreciated that the Shutdown equalization paths 1-5 described herein are presented for purposes of illustration, in other cases, other combinations and permutations of equalization paths are possible. For example, one or more of the Shutdown equalization paths 1-5 may occur simultaneous in order to support the equalization of head space pressure between the drain tank 216 and the reactor vessel 204.

Figure 13:
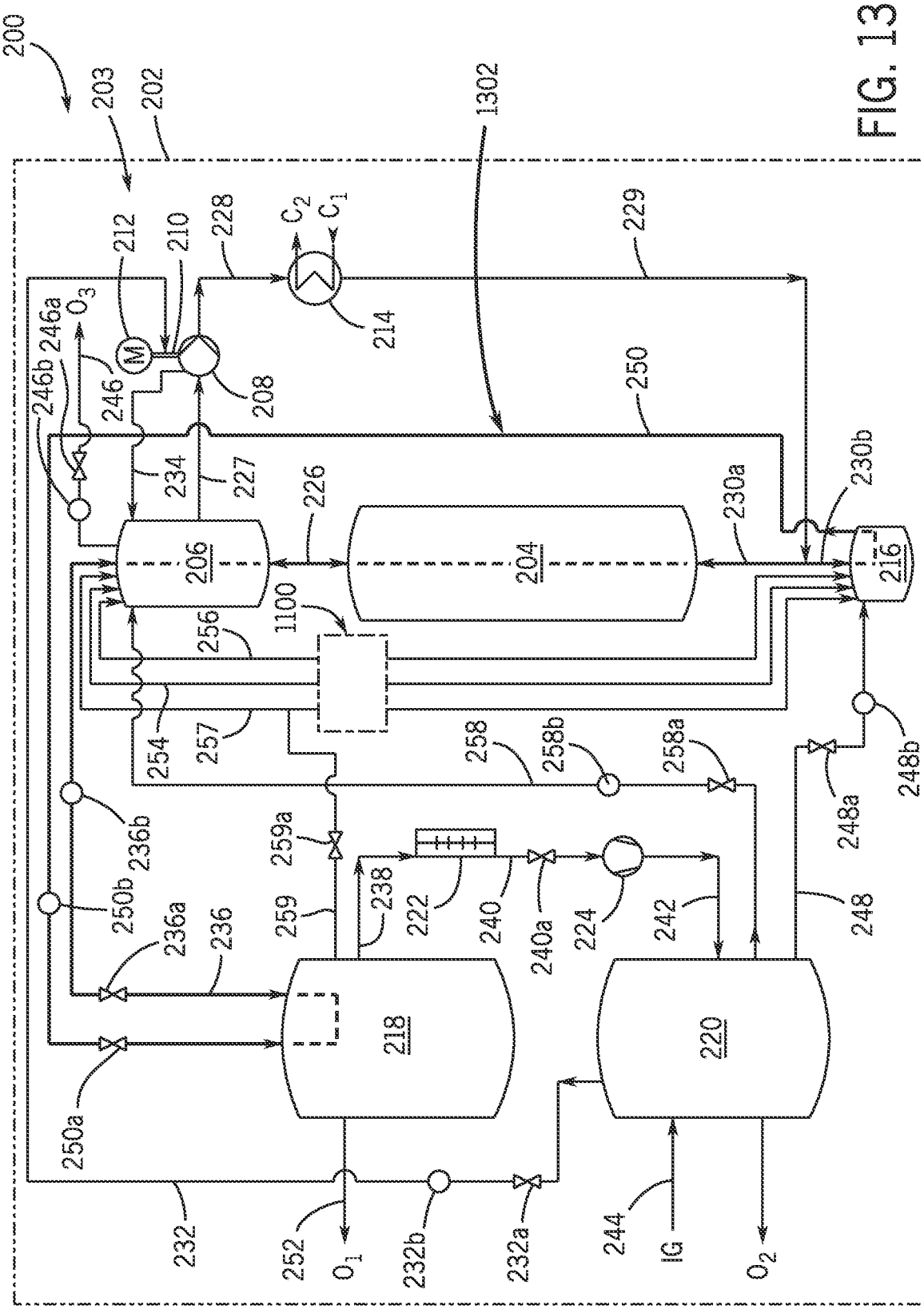
FIG. 13 depicts another flow path along the piping and instrument diagram of the molten salt reactor system of FIG. 2 indicative of another equalization flow path.

In an alternative configuration, the molten salt reactor system 200 may seek to equalize pressure between the head space of the drain tank 216 and the reactor vessel 204 without using the equalization system 1100 depicted in FIGS. 11A—11E. For example, the system 200 may use the low pressure inert gas vessel 218 to cause such equalization. As one example, FIG. 13 shows an equalization flow path 1302 in which the operating valves 250a, 236a remain open while other operating valves of the system 200 are closed. This configuration shows that the head space of the drain tank 216 and the reactor vessel 206 may be fluidically coupled to one another which may facilitate draining of the fuel salt into the drain tank 216. For example, the equalization flow path 1302 is shown in FIG. 13, as fluidically coupling the head space of the drain tank 216 to the low pressure inert gas vessel 218 via the pipe segment 250 due to the operating valve 250a remaining open. The equalization flow path 1302 is further shown as fluidically coupling the low pressure inert gas vessel 218 with the reactor access vessel 206 via the pipe segment 236 due to the operating valve 236a remaining open. Additionally or alternatively, the low pressure inert gas vessel 218 may be fluidically coupled via pipe segment 259 and operating valve 259a. The equalization flow path 1302 may proceed from the reactor access vessel 206, through the pipe segment 226, through the reactor vessel 204, through the pipe segment 230a, through the pipe segment 230b, into the head space of the drain tank 216, and back into the pipe segment 250. In this regard, the fluidic coupling of the various components along the equalization flow path 1302 may permit the reactor vessel 204 and the head space of the drain tank 216 to have a similar or general equal pressure differential such that the fuel salt may flow into the drain tank 216.

Figure 14:
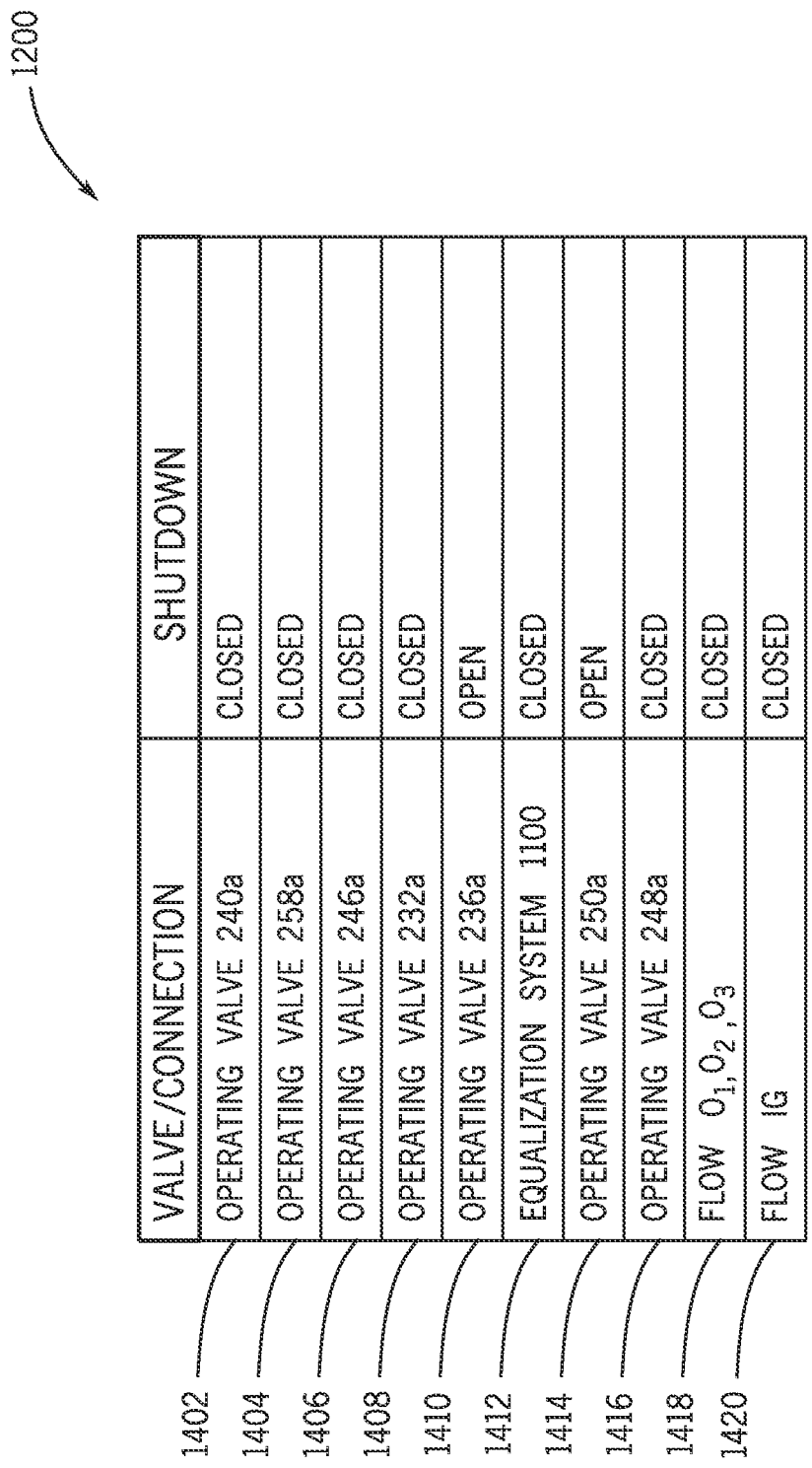
FIG. 14 depicts a table indicating another example status of certain valves of the molten salt reactor system of FIG. 2 during a shutdown event associated with the flow path depicted in FIG. 13.

With reference to FIG. 14, a valving diagram 1400 is depicted corresponding to the shutdown operations of the molten salt reactor system 200, such as those that may be associated with the configuration shown with respect to the equalization flow path 1302 of FIG. 13. As described herein, in the event of a shutdown, the molten salt reactor system 200 may function to both equalize pressure between the head space of the drain tank 216 and the reactor vessel 204 (to permit draining of the fuel salt into the drain tank 216), and to cease the flow of inert gas to the head space of the various components of the molten salt reactor system 200 (to mitigate the ability of inert gas to build up and pressurize the system, which could impede draining of the fuel salt into the drain tank 216). In this regard, diagram 1400 shows at row 1402, the operating valve 240a as having a configuration of "closed." Further, the diagram 1400 shows at row 1404, the operating valve 258a as having a configuration of "closed." Further, the diagram 1400 shows at row 1406, the operating valve 246a as having a configuration of "closed." Further, the diagram 1400 shows at row 1408, the operating valve 232a as having a configuration of "closed." Further, the diagram 1400 shows at row 1410, the operating valve 236a as having a configuration of "open." Further, the diagram 1400 shows at row 1412, the equalization system 1100 as having a configuration of "closed." Further, the diagram 1400 shows at row 1414, the operating valve 250a as having a configuration of "open." Further, the diagram 1400 shows at row 1416, the operating valve 248a as having a configuration of "closed." Further, the diagram 1400 shows at row 1418, the off-gas flows $O_1$, $O_2$, $O_3$ as having a configuration of "closed." Further, the diagram 1400 shows at row 1420, the inert gas flow IG as having a configuration of "closed." By closing the operating valves 240a, 258a, 246a, 232a, 248a, off-gas flows $O_1$, $O_2$, $O2_3$ and inert gas flow IG, the molten salt reactor system 200 may prevent inert gas pressure from building up or otherwise interfering with the draining of the inert gas into the drain tank 216. The valving diagram 1200 further shows, at rows 1410, 1414 the operating valves 236a, 250a as having a configuration of "open." As described herein, by opening the operating valves 236a, 250a, the head space of the drain tank 216 and the reactor vessel 206 may be fluidically coupled such that the pressure of each is generally equalized to permit draining of the fuel salt into the drain tank 216.

The molten salt reactor system 200 may include numerous assemblies and configurations in order to facilitate the rapid equalization of pressure between the head space of the drain tank 216 and the reactor 204. For example, and as described herein, the molten salt reactor system 200 may use "fail-open" valves for at least the operating valves that are responsible for establishing the fluidic connection between the head space of the drain tank 216 and the reactor vessel 204 (such as the various operating valves of the equalization system 1100). Since such operating valves are configured as fail-open valves, any loss of power event or other emergency event in which the valves cease operating may result in the operating valves reverting to state in which the valves are opened. A state in which the valves are open allows for the establishment of the fluidic connection between the head space of the drain tank 216 and the reactor vessel 204, and as such, the failure of the valves (e.g., loss of power) may result in the draining of the molten fuel salt into the drain 216. Additionally, the molten salt reactor system 200 includes numerous redundancies such that the system 200 includes multiple avenues through which a fluidic connection may be established between the head space of the drain tank 216 and the reactor vessel 204. As one example, the pipe segments 254, 256, 257 are redundant pipe segments or equalization flow paths that extend in parallel between the head space of the drain tank 216 and the reactor access vessel 206. In this regard, in the event that one of the pipe segments becomes plugged or is not usable, the other of the pipe segments may adequately establish a flow path between the drain tank 216 and the reactor access vessel 206. In the event that all pipe segments 254, 256, 257 are not operable or capable of establishing a fluidic connection between the drain tank 216 and the reactor access vessel 206, the molten salt reactor system 200 may operate one or more other operating valves in order to establish an alternative flow path through which the pressure in the head space of the drain tank 216 may be equalized with the pressure in the reactor vessel 204. For example, and as described in relation to FIGS. 13 and 14, the molten salt reactor system 200 may route inert gas along inert gas flow path 1302 such that the pressure in the drain tank 216 and the reactor vessel 204 may be equalized via flow path that circulates through the low pressure inert gas vessel 218.

Figure 15:
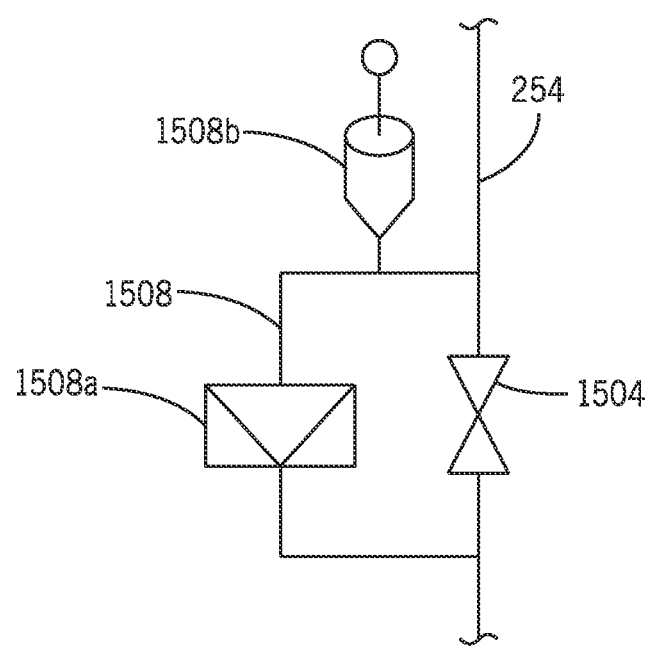
FIG. 15 depicts an example bypass of the molten salt reactor system of FIG. 2.

With reference to FIG. 15, the molten salt reactor system 200 may also include one or more bypass assemblies that may operate to establish additional flow paths between the drain tank 216 and the reactor vessel 204 in the event that any of the operating valves malfunction (e.g., such as the operating valves 263a, 263b, 267a, 267b, 271a, 271b). For example, in the event that the operating valves fail to open for any reason, it may be desirable to bypass the operating valves such that the associated pipe segments may still fluidically couple the drain tank 216 and the reactor access vessel 206. In this regard, as shown in FIG. 15, the pipe segment 254, for purposes of illustration, may be fluidically coupled with a bypass pipe segment 1508. The bypass pipe segment 1508 may extend from upstream of the operating valve 1504 (such as any of the operating valves described herein) to downstream of the operating valve 1504. The bypass pipe segment 1504 may include a burst disc 1508a and a gas bottle 1508b. In the event that the operating valve 1504 fails to open, pressurized contents of the gas bottle 1508b may be released such that the burst disc 1508a is ruptured. Additionally or alternatively, in the event that the operating valve 1504 fails to open, the burst disc 1508a may be ruptured by mechanical means, such as being ruptured via an impact from a pin, hammer, wedge and/or other mechanical device. In some cases, the burst disc 1508a may be ruptured via thermal means, such as by rupturing in response to an over temperature event. The rupturing of the burst disc 1508a may allow inert gas to flow between the drain tank 216 and the reactor access vessel 206 via the pipe segment 254 and the bypass pipe segment 1508 in order to equalize pressure between the drain tank 216 and the reactor access vessel 206. It will be appreciated that while FIG. 15 show one example illustration of a bypass assembly, the various molten salt systems described herein may include numerous such bypasses, as appropriate for a given application.

Figure 16:
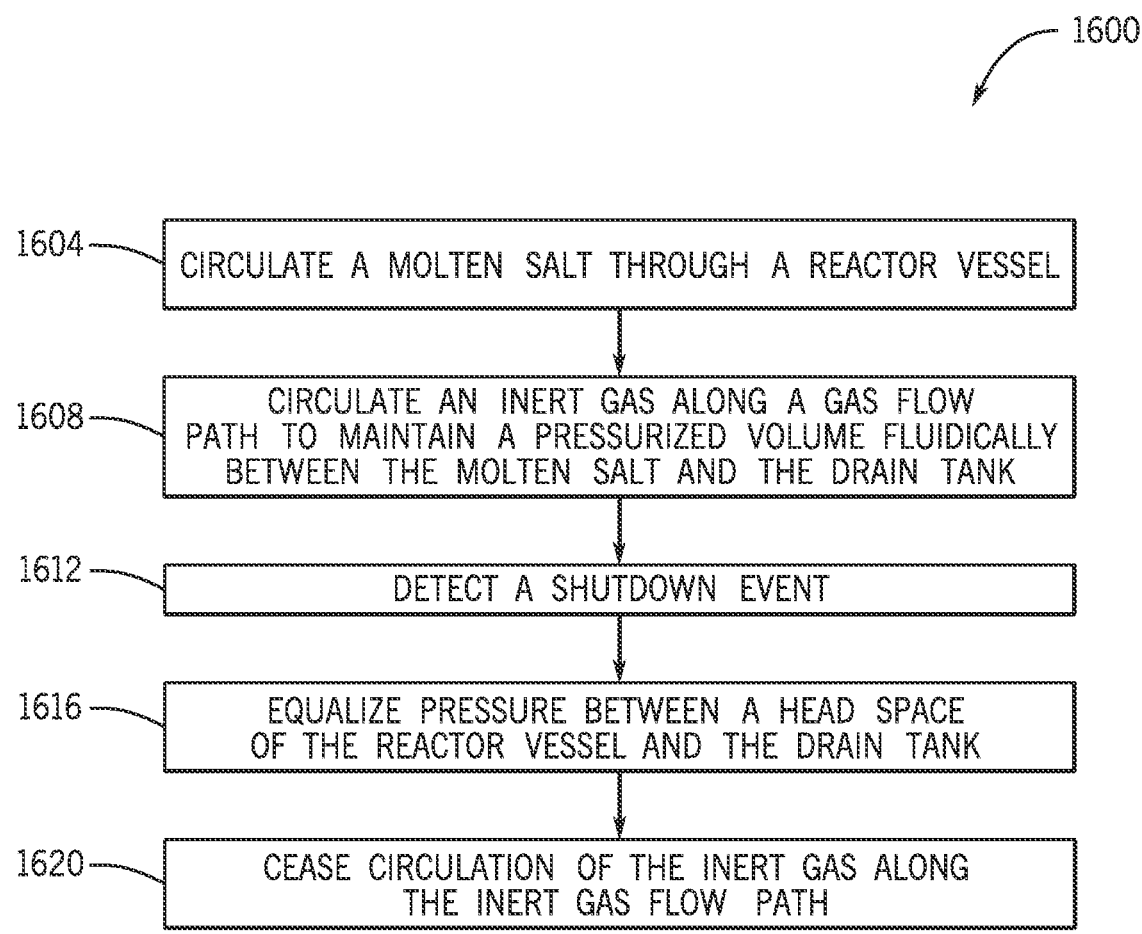
FIG. 16 depicts a flow diagram of an example method for depressurizing a molten salt reactor system during a shutdown event.

FIG. 16 depicts a flow diagram of an example method for depressurizing a molten salt reactor system during a shutdown event. At operation 1604, a molten salt is circulated through a reactor vessel. The reactor vessel may be a vessel along a molten salt loop, such as any of the molten salt loops described herein. For example, and with reference to FIGS. 2 and 3, the reactor pump 208 is configured to drive a molten fuel salt along the fuel salt flow path 3002. The fuel salt may generally proceed through the reactor vessel 204 (within which fission occurs), through the reactor access vessel 206, through the heat exchanger 214 (at which heat is removed from the salt) and back into the reactor vessel 204. Pressurized inert gas in the head space of the drain tank 216 may generally prevent the fuel salt from flowing into the drain tank 216 during normal operations.

At operation 1608, an inert gas is circulated along an inert gas flow path to maintain a pressurized volume fluidically between the molten salt and the drain tank. For example, and with reference to FIGS. 2 and 4, an inert gas may be circulated along the inert gas flow path 4002. The inert gas flow path 4002 may operate to provide pressurized inert gas to the head space of the drain tank 216 such that a pressurized volume may be maintained between the fuel salt and the drain tank 216 during normal operations. The inert gas flow path 4002 also provides for the relief of the inert gas from the drain tank 216 and pressurization of the inert gas, as described in greater detail herein in relation to FIG. 4. In some cases, the inert gas may be circulated along numerous other inert gas flow paths, such as those illustrated in relation to FIGS. 3-9.

At operation 1612, a shutdown event is detected. For example, and with reference to FIG. 2, it may be desirable to shutdown the molten salt reactor system 200 for any of a variety of reasons. In one example, a shutdown event is detected that is associated with a loss of power for the system 200. Additionally or alternatively, a shutdown event may be associated with regular maintenance to the system 200, or for any other reason in which it is desirable to drain the fuel salt into the drain tank 216. Further, a shutdown event may be detected based on a change in one or more monitored set points, such as a change in monitored temperature, pressure or a combination thereof.

At operation 1616, in response to the detection of the shutdown event, pressure is equalized between a head space of the reactor vessel and the drain tank. For example, and with reference to FIGS. 2 and 11A—11E, pressure between the head space of the reactor vessel 204 and the drain tank 216 may be equalized by operating the equalization system 1100. For example, the operating valves of the equalization system 1100 may be opened according to the valving diagram 1200 set forth in FIG. 12 in order to allow inert gas to flow along one or more of the equalization flow paths 254, 256, 257. The equalization flow paths 254, 256, 257 permit the inert gas to circulate relative to the head space of the drain tank 216 and the reactor access vessel 206 such that pressure may be equalized between the two vessels. With the pressure equalized between the heads space of the drain tank 216 and the reactor access vessel 206, the fuel salt may be allowed to flow into the drain tank 216 to facilitate shutdown operations.

At operation 1620, in response to the detection of the shutdown event, circulation of the inert gas flow paths is ceased. For example, and with reference to FIGS. 2, the flow of inert gas throughout the molten salt reactor system 200 may be ceased so as to limit the ability of such inert gas to pressurize the drain tank 216 or to otherwise impede the ability of the fuel salt to drain into the drain tank 216. In this regard, each of the operating valves 240a, 258a, 246a, 232a, 236a, 250a, 248a, and the off-gas flows $O_1$, $O_2$, $O_2$, and the inert gas flow IG, may be closed in such configuration.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A molten salt reactor system comprising
   a reactor vessel;
   a drain tank;
   a fuel salt system configured to circulate a molten salt through the reactor vessel;
   an inert gas system fluidically coupled with the fuel salt system and the drain tank; and
      wherein the inert gas system is configured to maintain a pressurized volume in a head space of the drain tank by circulating an inert gas along an inert gas flow path;
      wherein the pressurized volume prevents the molten salt from flowing from the reactor vessel into the drain tank; and
      wherein the inert gas system is configured to cease maintenance of the pressurized volume in response to a shutdown event;
   an equalization system configured to equalize pressure of a head space of the reactor vessel and the head space of the drain tank in response to the shutdown event thereby allowing the molten salt to gravitationally drain from the reactor vessel to the drain tank.

2. The system of claim 1, wherein the equalization system comprises a flow path with one or more fail-open equilibrium control valves in series with one another and each fluidically coupling the head space of the reactor vessel and the head space of the drain tank.

3. The system of claim 2, wherein the flow path comprises a first flow path; and
   wherein the equalization system further comprises a second flow path with one or more fail-open equilibrium control valves in series with one another and each fluidically coupling the head space of the reactor vessel and the head space of the drain tank.

4. The system of claim 3, wherein the equalization system further comprises a cross-connection fluidically coupling the first flow path of the equalization system and the second flow path of the equalization system.

5. The system of claim 4, wherein the equalization system further comprises a third flow path with one or more fail-open equilibrium control valves in series with one another and each fluidically coupling the head space of the reactor vessel and the head space of the drain tank.

6. The system of claim 5, wherein at least one fail-open equilibrium control valve of the equalization system is associated with a bypass comprising a burst disc.

7. The system of claim 6, wherein, in response to the associated fail-open equilibrium valve malfunctioning during the shutdown event, a pressurized gas container is configured to release pressurized contents of the container and cause a rupture of the burst disc, thereby permitting a flow to bypass the associated fail-open equilibrium valve.

8. The system of claim 6, wherein in response to the associated fail-open equilibrium valve malfunctioning during the shutdown event, the burst disc may be mechanically or thermally ruptured, thereby permitting a flow to bypass the associated fail-open equilibrium valve.

9. The system of claim 2, wherein
the inert gas system comprises a pair of fail-open inert gas control valves, and
the pair of fail-open inert gas control valves are configured to equalize pressure between the head space of the reactor vessel and the head space of the drain tank in response to the shutdown event.

10. The system of claim 9, wherein the pair of fail-open inert gas control valves are configured to equalize pressure between the head space of the reactor vessel and the head space of the drain tank automatically in response to an occurrence of both the shutdown event and a failure of the equalization system to equalize pressure between the head space of the reactor vessel and the drain tank.

11. The system of claim 1, wherein
the inert gas system comprises a first inert gas vessel, a second inert gas vessel fluidically coupled with the first inert gas vessel, and a compressor in-line between the first inert gas vessel and the second inert gas vessel,
the first inert gas vessel is arranged to receive inert gas from at least the inert gas flow path,
the compressor is configured to receive a flow of inert gas from the first inert gas vessel, increase a pressure of the flow of inert gas, and cause the flow of inert gas to be delivered to the second inert gas vessel, and
the second inert gas vessel is arranged to deliver inert gas to at least the inert gas flow path.

12. The system of claim 11, wherein the inert gas system is configured to maintain
a first inert gas pressure in the first inert gas vessel at around +2 psig to -2 psig,
a second inert gas pressure in the second inert gas vessel at around 50 psig, and
a third inert gas pressure in the pressurized volume in the head space of the drain tank at around 30 psig.

13. The system of claim 1, further comprising a molten salt loop,
wherein the molten salt loop includes a reactor pump,
wherein the inert gas flow path comprises a first inert gas flow path; and
wherein the inert gas system is further configured to maintain a gas seal at the reactor pump by circulating the inert gas along a second inert gas flow path,
the reactor pump configured to
drive the molten salt along the molten salt loop, and
relieve the gas seal in response to the shutdown event.

14. A molten salt nuclear reactor system comprising
a reactor vessel;
a drain tank;
a fuel salt system configured to circulate a molten salt through the reactor vessel;
an inert gas flow system
fluidically coupled with the fuel salt system and the drain tank, and
configured to maintain a pressurized volume located in a head space in the drain tank,
wherein the pressurized volume prevents molten salt to flow from the reactor vessel into the drain tank, and
wherein the inert gas flow system is configured to cease maintenance of the pressurized volume in response to a reactor shutdown event;
an equalization system configured to equalize pressure inside a head space in the reactor vessel and the head space in the drain tank in response to the reactor shutdown event, the equalization system comprising
a cross-connection fluidically coupling a first flow path of the equalization system and a second flow path of the equalization system;
wherein the equalization allows molten salt to flow by gravity from the reactor vessel into the drain tank.

15. A molten salt nuclear reactor system comprising
a reactor vessel;
a drain tank;
a fuel salt system configured to circulate a molten salt through the reactor vessel;
an inert gas flow system
fluidically coupled with the fuel salt system and fluidically coupled with the drain tank by an inert gas flow path, and
configured to maintain a pressurized volume located in a head space in the drain tank,
wherein the pressurized volume prevents molten salt to flow from the reactor vessel into the drain tank,
the inert gas flow system comprising
a first inert gas vessel, a second inert gas vessel fluidically coupled with the first inert gas vessel, and a compressor in-line between the first inert gas vessel and the second inert gas vessel,
wherein the first inert gas vessel is arranged to receive inert gas from at least the inert gas flow path,
wherein the compressor is configured to receive a flow of inert gas from the first inert gas vessel, increase a pressure of the flow of inert gas, and cause the flow of inert gas to be delivered to the second inert gas vessel, and
wherein the second inert gas vessel is arranged to deliver inert gas to at least the inert gas flow path;
wherein the inert gas flow system is configured to cease maintenance of the pressurized volume in response to a reactor shutdown event;
an equalization system configured to equalize pressure inside a head space in the reactor vessel and the head space in the drain tank in response to the reactor shutdown event,
wherein the equalization allows molten salt to flow by gravity from the reactor vessel into the drain tank.

* * * * *